United States Patent
Vantalon et al.

(10) Patent No.: US 8,321,636 B2
(45) Date of Patent: Nov. 27, 2012

(54) MEMORY REALLOCATION AND SHARING IN ELECTRONIC SYSTEMS

(75) Inventors: Nicolas P. Vantalon, San Jose, CA (US); Steven A. Gronemeyer, San Jose, CA (US); Vojislav Protic, San Jose, CA (US)

(73) Assignee: CSR Technology Inc., Sunnyvale, CA (US)

( * ) Notice: Subject to any disclaimer, the term of this patent is extended or adjusted under 35 U.S.C. 154(b) by 0 days.

(21) Appl. No.: 11/369,898

(22) Filed: Mar. 6, 2006

(65) Prior Publication Data

US 2006/0248289 A1 Nov. 2, 2006

Related U.S. Application Data

(63) Continuation of application No. 10/696,522, filed on Oct. 28, 2003, now Pat. No. 7,047,368.

(60) Provisional application No. 60/499,961, filed on Sep. 2, 2003.

(51) Int. Cl.
*G06F 13/12* (2006.01)

(52) U.S. Cl. ........ 711/147; 711/153; 710/104; 710/306; 710/308

(58) Field of Classification Search .................. 711/147, 711/153; 710/104, 306, 308
See application file for complete search history.

(56) References Cited

U.S. PATENT DOCUMENTS

| | | |
|---|---|---|
| 4,947,477 A | 8/1990 | Little |
| 5,663,734 A | 9/1997 | Krasner |
| 5,663,735 A | 9/1997 | Eshenbach |
| 5,754,807 A * | 5/1998 | Lambrecht et al. ........... 710/308 |
| 5,781,156 A | 7/1998 | Krasner |
| 5,809,261 A * | 9/1998 | Lambrecht .................... 710/306 |
| 5,812,087 A | 9/1998 | Krasner |
| 5,825,327 A | 10/1998 | Krasner |
| 5,831,574 A | 11/1998 | Krasner |

(Continued)

FOREIGN PATENT DOCUMENTS

EP 0 428 329 A2 * 5/1991

(Continued)

OTHER PUBLICATIONS

Marketing Material: Qualcomm CDMA Technologies—Integrated Solutions—MGP6200™ Multimode GPS Processor (8 pages).

(Continued)

*Primary Examiner* — Yaima Campos
*Assistant Examiner* — Samuel Dillon
(74) *Attorney, Agent, or Firm* — Pillsbury Winthrop Shaw Pittman LLP

(57) ABSTRACT

Memory reallocation and sharing among components of an electronic system is provided. The electronic system includes a first memory area coupled for access by a first processor via a first bus, and a second memory area coupled for access by a second processor via a second bus. An example system includes a central processor as the first processor and a digital signal processor as the second processor. The electronic system further includes memory configurations that support shared access of the second memory area by the first processor. Using shared access, the first processor can directly access the second memory via the first bus or indirectly access the second memory via the second bus and the second processor. The memory sharing also includes partitioning the shared memory to simultaneously provide the first processor with direct and indirect access to the shared memory.

18 Claims, 23 Drawing Sheets

U.S. PATENT DOCUMENTS

| | | | |
|---|---|---|---|
| 5,841,396 A | | 11/1998 | Krasner |
| 5,874,914 A | | 2/1999 | Krasner |
| 5,884,214 A | | 3/1999 | Krasner |
| 5,911,149 A | * | 6/1999 | Luan et al. ............... 711/147 |
| 5,945,944 A | | 8/1999 | Krasner |
| 5,983,332 A | * | 11/1999 | Watkins ............... 711/202 |
| 5,999,124 A | | 12/1999 | Sheynblat |
| 6,002,363 A | | 12/1999 | Krasner |
| 6,006,309 A | | 12/1999 | Shelly et al. |
| 6,016,119 A | | 1/2000 | Krasner |
| 6,044,452 A | * | 3/2000 | Birch et al. ............... 712/28 |
| 6,052,081 A | | 4/2000 | Krasner |
| 6,061,018 A | | 5/2000 | Sheynblat |
| 6,064,336 A | | 5/2000 | Krasner |
| 6,104,338 A | | 8/2000 | Krasner |
| 6,104,340 A | | 8/2000 | Krasner |
| 6,107,960 A | | 8/2000 | Krasner |
| 6,111,540 A | | 8/2000 | Krasner |
| 6,131,067 A | | 10/2000 | Girerd |
| 6,133,871 A | | 10/2000 | Krasner |
| 6,133,873 A | | 10/2000 | Krasner |
| 6,133,874 A | | 10/2000 | Krasner |
| 6,150,980 A | | 11/2000 | Krasner |
| 6,185,427 B1 | | 2/2001 | Krasner |
| 6,208,290 B1 | | 3/2001 | Krasner |
| 6,208,291 B1 | | 3/2001 | Krasner |
| 6,215,441 B1 | | 4/2001 | Moeglein |
| 6,215,442 B1 | | 4/2001 | Sheynblat |
| 6,236,354 B1 | | 5/2001 | Krasner |
| 6,239,742 B1 | | 5/2001 | Krasner |
| 6,247,088 B1 | * | 6/2001 | Seo et al. ............... 710/305 |
| 6,259,399 B1 | | 7/2001 | Krasner |
| 6,266,751 B1 | | 7/2001 | Niescier |
| 6,272,430 B1 | | 8/2001 | Krasner |
| 6,289,041 B1 | | 9/2001 | Krasner |
| 6,307,504 B1 | | 10/2001 | Sheynblat |
| 6,313,786 B1 | | 11/2001 | Sheynblat |
| 6,314,308 B1 | | 11/2001 | Sheynblat |
| 6,321,284 B1 | * | 11/2001 | Shinohara et al. ............ 710/113 |
| 6,377,209 B1 | | 4/2002 | Krasner |
| 6,408,196 B2 | | 6/2002 | Sheynblat |
| 6,411,254 B1 | | 6/2002 | Moeglein |
| 6,411,892 B1 | | 6/2002 | Van Diggelen |
| 6,417,801 B1 | | 7/2002 | Van Diggelen |
| 6,421,002 B2 | | 7/2002 | Krasner |
| 6,429,814 B1 | | 8/2002 | Van Diggelen et al. |
| 6,433,731 B1 | | 8/2002 | Sheynblat |
| 6,453,237 B1 | | 9/2002 | Fuchs et al. |
| 6,484,097 B2 | | 11/2002 | Fuchs et al. |
| 6,487,499 B1 | | 11/2002 | Fuchs et al. |
| 6,510,387 B2 | | 1/2003 | Fuchs et al. |
| 6,542,821 B2 | | 4/2003 | Krasner |
| 6,583,757 B2 | | 6/2003 | Krasner |
| 6,597,311 B2 | | 7/2003 | Sheynblat |
| 6,636,939 B1 | * | 10/2003 | George ............... 711/111 |
| 6,697,906 B1 | * | 2/2004 | Ayukawa et al. ............ 710/316 |
| 6,728,822 B1 | * | 4/2004 | Sugawara et al. ............ 710/311 |
| 6,745,308 B2 | * | 6/2004 | Frank et al. ............... 711/169 |
| 6,912,612 B2 | * | 6/2005 | Kapur et al. ............... 710/309 |
| 6,965,974 B1 | * | 11/2005 | Bays et al. ............... 711/153 |
| 7,051,139 B2 | | 5/2006 | Peleg et al. |
| 7,076,609 B2 | * | 7/2006 | Garg et al. ............... 711/120 |
| 7,103,705 B2 | | 9/2006 | Ku |
| 7,111,050 B2 | * | 9/2006 | McAdams ............... 709/216 |
| 8,065,461 B2 | * | 11/2011 | LaBerge ............... 710/310 |
| 2001/0042219 A1 | * | 11/2001 | Robertson ............... 713/400 |
| 2002/0038408 A1 | * | 3/2002 | Metayer et al. ............ 711/141 |
| 2003/0188075 A1 | | 10/2003 | Peleg et al. |
| 2004/0158684 A1 | | 8/2004 | Ku |

FOREIGN PATENT DOCUMENTS

| | | |
|---|---|---|
| JP | 63018448 | 1/1988 |
| JP | 3214250 | 9/1991 |
| JP | 05-197617 * | 8/1993 |

OTHER PUBLICATIONS

Marketing Material: uNav Microelectronics—uN9x18 Low Power, High Performance GPS Receiver Chipset/uN9x18 GPS Receiver Solution (9 pages).

Marketing Material: uNav Microelectronics, uN9x18 Low Power, High Performance GPS Receiver Chipset (2 pages).

Marketing Material: Global Locate—Hammerhead II™, Single Chip AGPS Solution (2 pages).

Marketing Material/Press Release: Broadcom Introduces Advanced Single-Chip GPS Solution for Mobile Applications (3 pages).

Marketing Material/White Paper SnapTrack: A Qualcomm Company—SnapTrack's Wireless Assisted GPS™ (A-GPS) Solution Provides the Industry's Best Location System—Location Technologies for GSM, GPRS and WCDMA Networks (Qualcomm CDMA Technologies: Enabling the Future of Communications) (4 pages).

New Fast GPS Code Acquisition Using FFT, Electronic Letters, vol. 27 No. 2, pp. 158-160 (1991) (2 pages).

Novel Fast GPS/GLONASS Code Acquisition Technique Using Low Update Rate FFT, Electronic Letters, vol. 28 No. 9, pp. 863-865 (3 pages).

* cited by examiner

RAM_CTL: (address=0xC0000000)

| 15 | 14 | 13 | 12 | 11 | 10 | 9 | 8 |
|---|---|---|---|---|---|---|---|
| R | R | R | R | R | R | R | RW |
| 0 | 0 | 0 | 0 | 0 | 0 | 0 | 0 |
| - | - | - | - | - | - | - | - |

Reset value

1500

| 7 | 6 | 5 | 4 | 3 | 2 | 1 | 0 |
|---|---|---|---|---|---|---|---|
| RW | RW | RW | RW | RW | RW | RW | RW |
| 0 | 0 | 0 | 0 | 0 | 0 | 0 | 0 |
| SWI_ENB | | MAP_BLK[2] | MAP_BLK[1] | MAP_BLK[0] | DSP64K MAP_ENB | EN_CPU_WAB | EN_CPU_RAB |

Reset value

Fig. 15

RAM_STA: (address=0xC0000004)

| 15 | 14 | 13 | 12 | 11 | 10 | 9 | 8 |
|---|---|---|---|---|---|---|---|
| R | R | R | R | R | R | R | R |
| 0 | 0 | 0 | 0 | 0 | 0 | 0 | 0 |
| - | - | - | - | - | - | - | - |

Reset value

1600

| 7 | 6 | 5 | 4 | 3 | 2 | 1 | 0 |
|---|---|---|---|---|---|---|---|
| R | R | R | R | R | R | RW | RW |
| 0 | 0 | 0 | 0 | 0 | 0 | 0 | 0 |
| - | - | - | - | - | - | CPUW_VIO | CPUR_VIO |

Reset value

Fig. 16

DSP_ADDR: (address=0xC0000008)

| 15 | 14 | 13 | 12 | 11 | 10 | 9 | 8 |
|---|---|---|---|---|---|---|---|
| R | R | R | R | R | R | R | R |
| 0 | 0 | 0 | 0 | 0 | 0 | 0 | 0 |
| DSP_ADD[15] | • | • | • | • | • | • | • |
| Reset value | | | | | | | |

| 7 | 6 | 5 | 4 | 3 | 2 | 1 | 0 |
|---|---|---|---|---|---|---|---|
| R | R | R | R | R | R | R | R |
| 0 | 0 | 0 | 0 | 0 | 0 | 0 | 0 |
| • | • | • | • | • | • | • | DSP_ADD[0] |
| Reset value | | | | | | | |

| Number of 8kbyte Blocks Mapped | DSP32K_SWI_ENB | DSP64K_MAP_ENB | MAP_BLK[2:0] | DSP Address Range | CPU Normal Mapped SBU2 Address Range | CPU Soft Mapped SBU2 Address Range | CPU Hard Mapped ASB Address Range |
|---|---|---|---|---|---|---|---|
| 1 | 0 | 0 | XXX | 0x0000_0000-0x0001_FFFF | 0xC020_0000-0xC021_FFFF | NA | NA |
|   | 1 | X | XXX | 0x0000_0000-0x0001_7FFF | 0xC021_8000-0xC021_FFFF | NA | 0x6001_0000-0x6001_7FFF |
|   | 0 | 1 | 000 | 0x0000_0000-0x0001_DFFF | 0xC021_E000-0xC021_FFFF | 0x6001_0000-0x6001_1FFF | NA |
| 2 | 0 | 0 | XXX | 0x0000_0000-0x0001_FFFF | 0xC020_0000-0xC021_FFFF | NA | NA |
|   | 1 | X | XXX | 0x0000_0000-0x0001_7FFF | 0xC021_8000-0xC021_FFFF | NA | 0x6001_0000-0x6001_7FFF |
|   | 0 | 1 | 001 | 0x0000_0000-0x0001_BFFF | 0xC021_C000-0xC021_FFFF | 0x6001_0000-0x6001_3FFF | NA |
| 3 | 0 | 0 | XXX | 0x0000_0000-0x0001_FFFF | 0xC020_0000-0xC021_FFFF | NA | NA |
|   | 1 | X | XXX | 0x0000_0000-0x0001_7FFF | 0xC021_8000-0xC021_FFFF | NA | 0x6001_0000-0x6001_7FFF |
|   | 0 | 1 | 010 | 0x0000_0000-0x0001_9FFF | 0xC021_A000-0xC021_FFFF | 0x6001_0000-0x6001_5FFF | NA |
| 4 | 0 | 0 | XXX | 0x0001_0000-0x0001_FFFF | 0xC020_0000-0xC021_FFFF | NA | NA |
|   | 1 | X | XXX | 0x0000_0000-0x0001_7FFF | 0xC021_8000-0xC021_FFFF | NA | 0x6001_0000-0x6001_7FFF |
|   | 0 | 1 | 011 | 0x0000_0000-0x0001_7FFF | 0xC021_8000-0xC021_FFFF | 0x6001_0000-0x6001_7FFF | NA |
| 5 | 0 | 0 | XXX | 0x0001_0000-0x0001_FFFF | 0xC020_0000-0xC021_FFFF | NA | NA |
|   | 1 | 0 | XXX | 0x0000_0000-0x0001_7FFF | 0xC021_8000-0xC021_FFFF | NA | 0x6001_0000-0x6001_7FFF |
|   | 1 | 1 | 100 | 0x0000_0000-0x0001_5FFF | 0xC021_6000-0xC021_FFFF | 0x6001_8000-0x6001_9FFF | 0x6001_6000-0x6001_7FFF |
|   | 0 | 1 | 100 | 0x0000_0000-0x0001_5FFF | 0xC021_6000-0xC021_FFFF | 0x6001_0000-0x6001_9FFF | NA |
| 6 | 0 | 0 | XXX | 0x0001_0000-0x0001_FFFF | 0xC020_0000-0xC021_FFFF | NA | NA |
|   | 1 | 0 | XXX | 0x0000_0000-0x0001_7FFF | 0xC021_8000-0xC021_FFFF | NA | 0x6001_0000-0x6001_7FFF |
|   | 1 | 1 | 101 | 0x0000_0000-0x0001_3FFF | 0xC021_4000-0xC021_FFFF | 0x6001_8000-0x6001_BFFF | 0x6001_0000-0x6001_7FFF |
|   | 1 | 1 | 101 | 0x0000_0000-0x0001_3FFF | 0xC021_4000-0xC021_FFFF | 0x6001_0000-0x6001_BFFF | NA |
| 7 | 0 | 0 | XXX | 0x0001_0000-0x0001_FFFF | 0xC020_0000-0xC021_FFFF | NA | NA |

| Number of 8kbyte Blocks Mapped | DSP32K_SWI_ENB | DSP64K_MAP_ENB | MAP_BLK[2:0] | DSP Address Range | CPU Normal Mapped SBU2 Address Range | CPU Soft Mapped SBU2 Address Range | CPU Hard Mapped ASB Address Range |
|---|---|---|---|---|---|---|---|
| | 1 | 0 | XXX | 0x0000_0000-0x0001_7FFF | 0xC021_8000-0xC021_FFFF | NA | 0x6001_0000-0x6001_7FFF |
| | 1 | 1 | 110 | 0x0000_0000-0x0001_1FFF | 0xC021_2000-0xC021_FFFF | 0x6001_8000-0x6001_DFFF | 0x6001_0000-0x6001_7FFF |
| | 0 | 1 | 110 | 0x0000_0000-0x0001_1FFF | 0xC021_2000-0xC021_FFFF | 0x6001_0000-0x6001_DFFF | NA |
| 8 | 0 | 0 | XXX | 0x0001_0000-0x0001_FFFF | 0xC020_0000-0xC021_FFFF | NA | NA |
| | 1 | 0 | XXX | 0x0000_0000-0x0001_7FFF | 0xC021_8000-0xC021_FFFF | NA | 0x6001_0000-0x6001_7FFF |
| | 1 | 1 | 111 | 0x0000_0000-0x0000_FFFF | 0xC021_0000-0xC021_FFFF | 0x6001_8000-0x6001_EFFF | 0x6001_0000-0x6001_7FFF |
| | 0 | 1 | 111 | 0x0000_0000-0x0000_FFFF | 0xC021_0000-0xC021_FFFF | 0x6001_0000-0x6001_FFFF | NA |

000
MEMORY REALLOCATION AND SHARING IN ELECTRONIC SYSTEMS

RELATED APPLICATION

This application claims priority to and is a continuation of U.S. patent application Ser. No. 10/696,522, entitled "MEMORY REALLOCATION AND SHARING IN ELECTRONIC SYSTEMS," filed Oct. 28, 2003, which issued as U.S. Pat. No. 7,047,368, on May 16, 2006, and which claims priority from U.S. Patent Application No. 60/499,961 filed Sep. 2, 2001 both of which applications are incorporated herein in their entireties by this reference.

TECHNICAL FIELD

The disclosed embodiments relate to memory partitioning and sharing in electronic systems.

BACKGROUND

Portable processor-based devices have become very popular in societies around the world. As the popularity of portable electronic devices has increased, so too has consumer dependence on these devices. Consumers now rely on portable electronic devices like personal computers, cellular telephones, and Global Positioning System (GPS) devices, for example, for everything from remote Internet access to communication. Increasingly, consumers demand varied data and voice capabilities in one relatively small device. Manufacturers have responded by producing handheld devices with multiple data, voice and GPS capabilities.

An example of a device that performs several functions or applications is a cellular phone that can send and receive email, send and receive text messages, and locate itself using GPS technology. Personal digital assistants (PDAs) also provide increasingly varied applications to users. Each application requires processing power and memory, some of which may be resident on the device, and some of which may be remotely hosted. Various manufacturers typically produce components and software to perform specific functions on a device. These various components and associated software for various functions are typically inserted in a larger system and must communicate and cooperate so as to efficiently use available resources on the device, including processor cycles and memory.

Even though semiconductor manufacturing technology has progressed to produce greater capability in ever smaller packages, there is always a demand for more processing power and memory, especially on small devices. For example, if memory is not used efficiently, it may be necessary to provide more physical memory, which increases both size and cost of the device. It is therefore desirable for the specifically designed hardware and software to be configurable to flexibly allocate scarce resources, such as memory, when inserted in the larger system of the device. It is further desirable for the specifically designed hardware and software to flexibly allocate resources transparently to other components in the larger system.

BRIEF DESCRIPTION OF THE FIGURES

FIG. 15 is a block diagram of a control register that supports memory sharing, under an embodiment.

FIG. 16 is a block diagram of a status register that supports memory sharing, under an embodiment.

FIG. 17 is a block diagram of a read/write violation address register that supports memory sharing, under an embodiment.

FIGS. 18A and 18B show an address map that supports memory sharing, under an embodiment.

Figure 1:
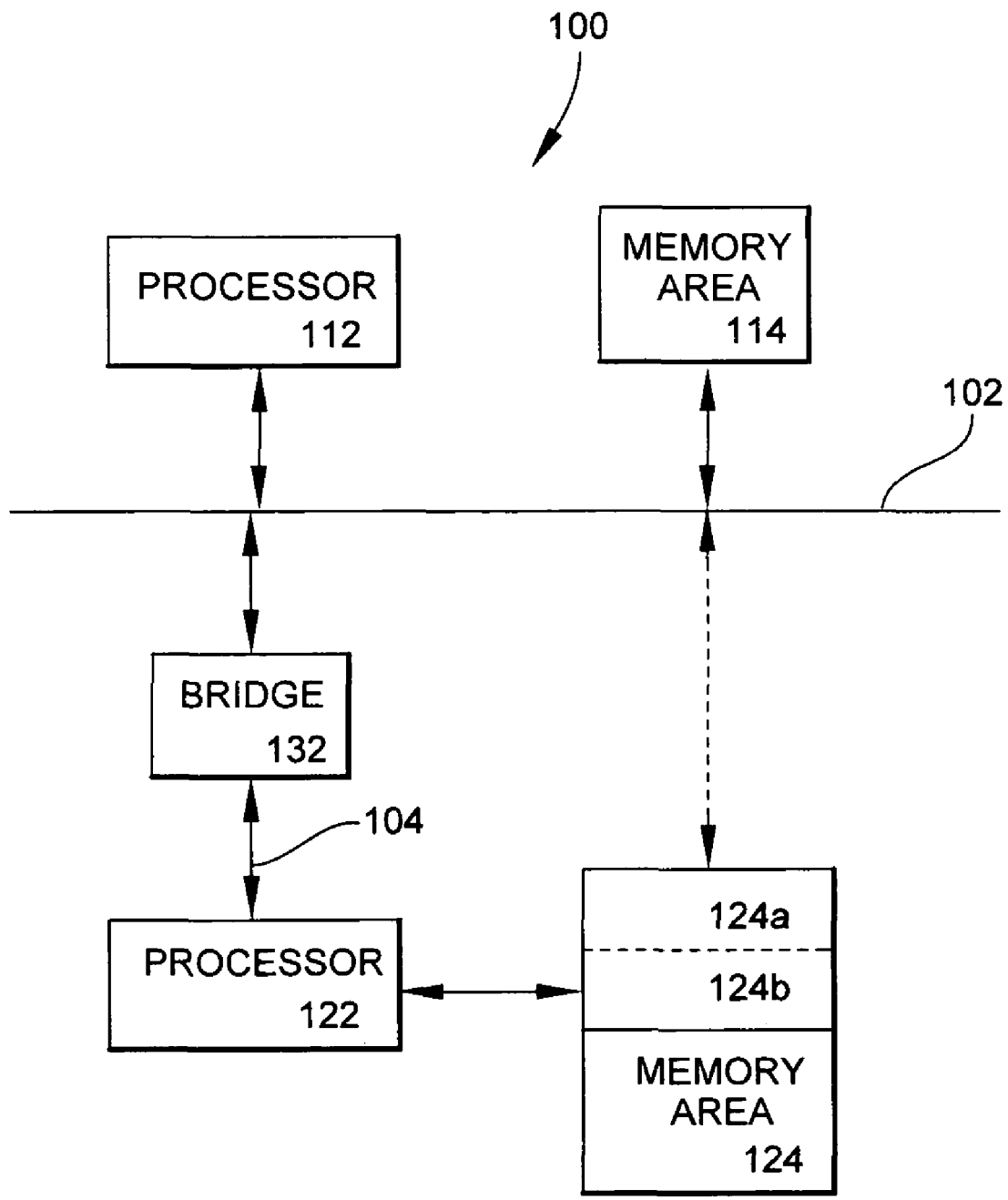
FIG. 1 is a block diagram of an electronic system supporting core memory partitioning and sharing among components including multiple processors, under an embodiment.

In the drawings, the same reference numbers identify identical or substantially similar elements or acts. To easily identify the discussion of any particular element or act, the most significant digit or digits in a reference number refer to the Figure number in which that element is first introduced (e.g., element 232 is first introduced and discussed with respect to FIG. 2).

DETAILED DESCRIPTIONS

Transparent memory sharing is provided herein in which components of an electronic system dynamically reallocate one or more memory areas for sharing among components of the system. Prespecified memory blocks of the memory areas are dynamically reallocated among components of the system using one or more reallocation methods in response to the changing memory requirements of the components. The memory reallocation/sharing is transparent to software of the host system. As an example, groups of memory locations or addresses, also referred to as memory blocks, can be shared by a first processor and a second processor. The first processor includes, for example, a central processor or microprocessor configured to access a first memory area, while the second processor might include a digital signal processor (DSP) configured to access a second memory area. The memory sharing provides the processor direct access, indirect access, and combination direct/indirect access to the second memory area, as described below.

In the following description, numerous specific details are introduced to provide a thorough understanding of, and enabling description for, embodiments of the memory sharing. One skilled in the relevant art, however, will recognize that the memory sharing can be practiced without one or more of the specific details, or with other components, systems, etc. In other instances, well-known structures or operations are not shown, or are not described in detail, to avoid obscuring aspects of the memory sharing.

FIG. 1 is a block diagram showing core memory reallocation for sharing among components of an electronic system 100, under an embodiment. Generally, the electronic system 100 includes a first processor 112 and a first memory area 114 coupled to a first bus 102, as an example in operation the first processor 112 accesses the first memory area 114 via the first bus 102 in order to write processor data to and read from the first memory area 114.

A second processor 122 is coupled to the first bus 102 through a combination of a second bus 104 and a bridge unit 132. The second processor is also coupled to a second memory area 124. In operation the second processor 122 directly accesses the second memory area 124 in order to write data of the second processor to and read from the second memory area 124.

The core memory sharing described herein allows the first processor 112 to dynamically reallocate some block of the second memory area 124 for use in storing data of the first processor 112 using any of a number of memory reallocation methods. One method of memory reallocation referred to herein as mapping reallocation maps prespecified memory locations 124a of the second memory area 124 through the bridge unit 132 for access by the first processor via the second bus 104 and the second processor 122. Another method of memory reallocation referred to herein as switching reallocation provides the first processor 112 with direct access of prespecified memory locations 124a of the second memory area 124 via the first bus 102. An additional method of memory reallocation simultaneously supports mapping and switching reallocation of memory locations of the second memory area 124. These memory reallocation methods and their corresponding system configurations are described further below.

The processors 112 and 122 include any collection of computing components and devices operating together, as is known in the art. The processors 112 and 122 can also be components or subsystems within a larger computer system or network. The processors 112 and 122 can also be coupled among any number of components (not shown) known in the art, for example other buses, controllers, memory devices, and data input/output (I/O) devices, in any number of combinations.

Likewise, the first 114 and second 124 memory areas include any collection of memory devices or portions of memory devices operating together in collocated and/or distributed fashion, as is known in the art. The memory areas 114 and 124 can also be components or subsystems within a larger computer system or network memory. The memory areas 114 and 124 can also be coupled among any number of components (not shown) known in the art, for example other buses, controllers, memory devices, and data input/output (I/O) devices, in any number of combinations.

The buses 102 and 104 can include any medium by which files are communicated or transferred between the processing systems or components of processing systems. Therefore, the paths represented by the buses 102 and 104 include wireless connections, wired and/or trace connections, and hybrid wireless/wired connections. The paths also include couplings or connections to other systems as well as networks including local area networks (LANs), metropolitan area networks (MANs), wide area networks (WANs), proprietary networks, and interoffice or backend networks.

Further to the electronic system 100 is a system configuration in which the first processor 112 includes a central processing unit (CPU) or processor like, for example, an ARM microprocessor, alternatively referred to herein as an ARM or a microprocessor. Additionally, the second processor 122 includes a digital signal processor (DSP), but is not so limited. The first 114 and second 124 memory areas of this example include areas or memory locations of random access memory (RAM), but can include areas of numerous other types of memory/memory devices known in the art. While the first and second memory areas are shown herein as two separate areas or two separate devices, alternative embodiments of the memory sharing described herein can include any number of memory locations distributed among any number/combination of memory devices. A description follows of core memory sharing among the processor and the DSP of this system configuration.

Figure 2:
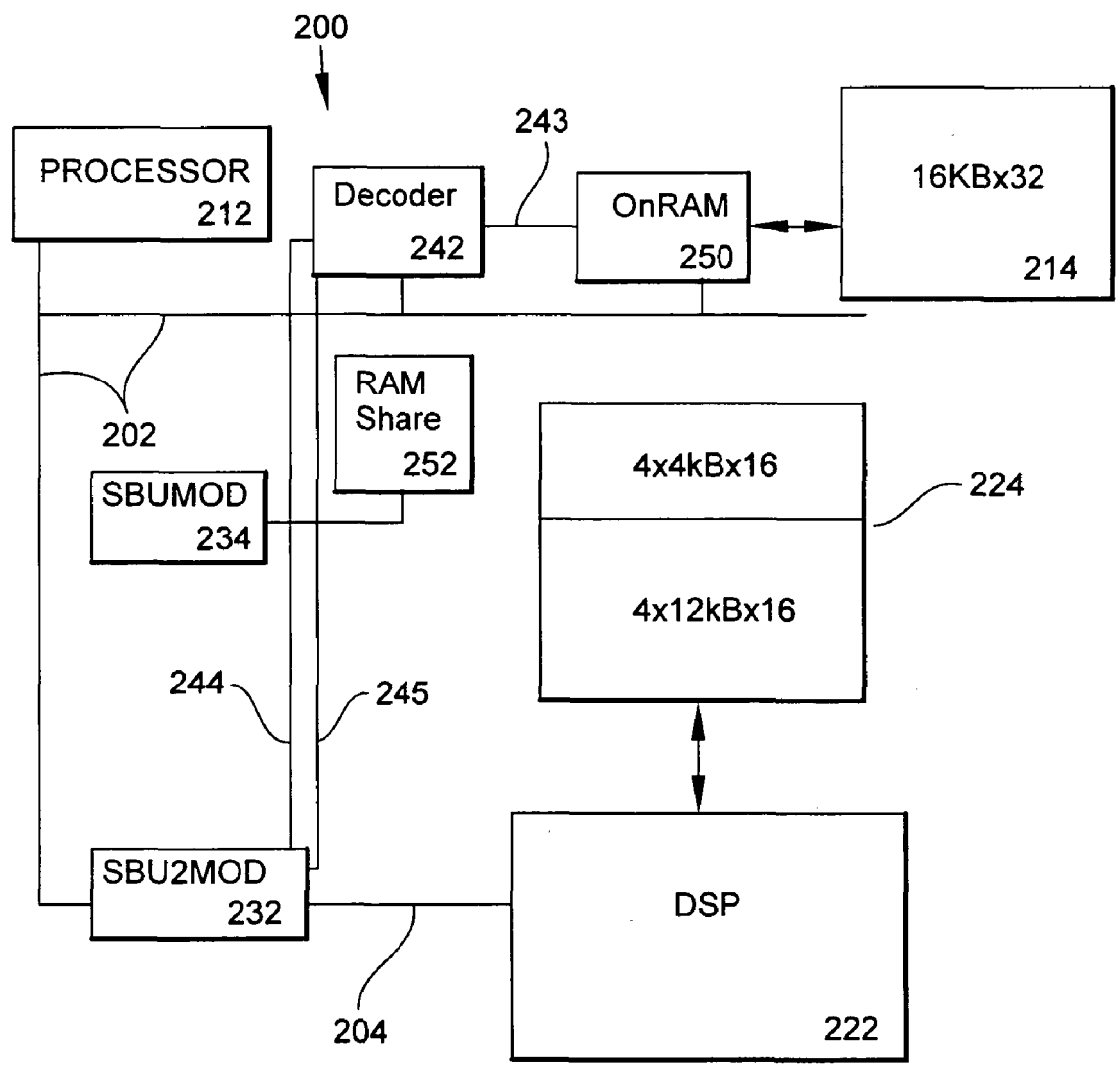
FIG. 2 is a block diagram of an electronic system configuration having memory areas dedicated to each of a central processor and a digital signal processor (DSP), under the embodiment of FIG. 1.

FIG. 2 is a block diagram of an electronic system 200 having memory areas 214 and 224 dedicated to each of a processor 212 and a DSP 222, respectively, under the embodiment of FIG. 1. The processor of an embodiment is an ARM processor 212, but the embodiment is not so limited as any type of processor 212 can be used in the system 200. A first data bus 202 couples the processor 212 to a memory area 214 via a memory controller OnRAM 250. The memory area 214 is referred to herein as processor memory 214 or, alternatively, ARM random access memory (RAM) 214. The first data bus 202, also referred to herein as the processor bus 202, supports the transfer of information or data among devices coupled to the processor bus 202 in a single clock cycle, but is not so limited.

The processor bus 202 further couples the processor 212 to the DSP 222 via a bridge unit SBU2MOD 232 and a second data bus 204. The bridge unit SBU2MOD 232 is referred to herein as a DSP bridge 232. The second data bus 204 is also referred to herein as the DSP bus 204. The DSP 222 is coupled to a memory area 224, referred to herein as DSP memory 224. The processor memory 214 and the DSP memory 224 of an embodiment are RAM devices, but are not so limited. Alternative embodiments can include any type of memory device and/or any combination of memory devices/types.

The DSP 222 and the DSP memory 224 are clocked at a speed (in a DSP clock domain) that differs from that of the processor 212 and the devices coupled to the processor bus 202 (in a processor clock domain). In an embodiment, the clock speed/domain of the DSP 222 and the DSP memory 224 is slower than that of the processor 212, but is not so limited. Consequently, data transfer from the DSP bridge 232 across the DSP bus 204 is slower relative to the data transfer across the processor bus 202. Further, the DSP bridge 232 of an embodiment is an asynchronous bridge because of the difference in clock speeds among components coupled to the processor bus 202 and components coupled to the DSP bus 204, but is not so limited.

Various alternative embodiments can clock the components of the system 200 using any number/combination of clock speeds; for example, one embodiment may clock the processor 212, the DSP 222, and DSP memory 224 at approximately equal speeds, while another embodiment may clock the processor 212 at a slower speed than the DSP 222 and/or the DSP memory 224.

The system 200 further includes at least one memory configuration register RAM Share 252 coupled to the processor bus 202. The memory configuration register 252, also referred to herein as a configuration register 252, couples to the processor bus 202 via a second bridge unit SBUMOD 234 and stores information for use by at least one of the processor 212, a decoder 242, and the DSP bridge 232 in controlling or managing the configuration of the DSP memory 224 as described below.

The decoder 242 is coupled among the processor bus 202, the DSP bridge 232, and the memory controller 250, but is not so limited. The decoder 242 receives addresses associated with data on the processor bus 202 and, in response, controls or manages the writing of data to and reading of data from the appropriate memory area in accordance with information of the memory configuration register 252. The decoder 242 controls the reading/writing of data to the processor memory 214 via control line 243 coupled between the decoder 242 and the memory controller 250. The decoder 242 controls the reading/writing of data to the DSP memory 224 via control line 244 and control line 245 coupled between the decoder 242 and the DSP bridge 232 as appropriate to the configuration of the DSP memory 224.

The DSP memory sharing of this system 200 generally allows the processor 212 to either directly access (in the processor clock domain) the DSP memory 224 on the processor bus 202 and/or indirectly access the DSP memory 224 (in the DSP clock domain) on the DSP bus 204. The direct access is accomplished by switching the upper 32-kbytes of DSP memory 224 from the DSP clock domain to the processor clock domain. The indirect access is accomplished by mapping blocks from the upper portion of the DSP memory 224 through the DSP bridge 232.

The DSP bridge 232 arbitrates between processor soft mapping access and DSP core access to the DSP memory. Further, the DSP bridge 232 supports indirect access to the DSP memory by the processor at address 0xC000_0000 (no soft mapping of processor addresses). The DSP bridge 232 also supports indirect access by the processor of the upper 64 kbytes of the DSP memory in the address range 0x6001_0000 to 0x6001_FFFF through soft mapping. Additionally, the DSP bridge 232 detects DSP memory read or write access violations based on DSP memory sharing control bits, generates violation status bits as appropriate, and generates processor abort cycles if enabled to do so during read or write access violations.

The configuration information of the memory configuration register 252 includes information of prespecified memory sharing configurations, but is not so limited. The processor 212, running under software control, selects a memory configuration appropriate to a state of the system 200 and sets bits of at least one register of the memory configuration register 252 in accordance with the selected memory configuration. In an embodiment, the configuration information corresponds to state information of the host electronic system so that the memory can be reallocated and shared according to different operating states of the host system when the different operating states have different memory requirements. Therefore, reallocation of the memory areas among components of the host system occurs in response to changes in operating states of the host system.

As an example of an apparatus and/or system using the memory sharing described above, the host systems can be systems that include one or more processors in need of efficient memory management. Examples of such devices/systems includes but is not limited to portable communication devices, portable position tracking devices, cellular telephones, cellular telephones coupled to and/or integrated with position tracking devices, mobile electronic devices, mobile communication devices, personal digital assistants, and other processor-based devices.

Consider as a specific example a mobile communication device like a cellular telephone that includes a positioning system like a Global Positioning System (GPS) receiver. In this type of system, the processor 212 described above corresponds to the central processing unit (CPU) of the communication device while the DSP 222 corresponds to a signal processor dedicated to processing GPS signals and receiver information. A GPS receiver has multiple modes of operation (e.g., cold start, warm start, hot start, etc.), all of which can have vastly different memory requirements. The memory reallocation and sharing of an embodiment allows for efficient use of the limited memory of such a portable device by allowing at least one area of device memory to be reallocated among the CPU and the DSP as appropriate to the operating state of the host device. The memory reallocation is transparent to the operating system software of the host device so that the operating system software sees a CPU memory map and a DSP memory map as configured by the memory configuration register 252 in response to the state of the host device.

Figure 3:
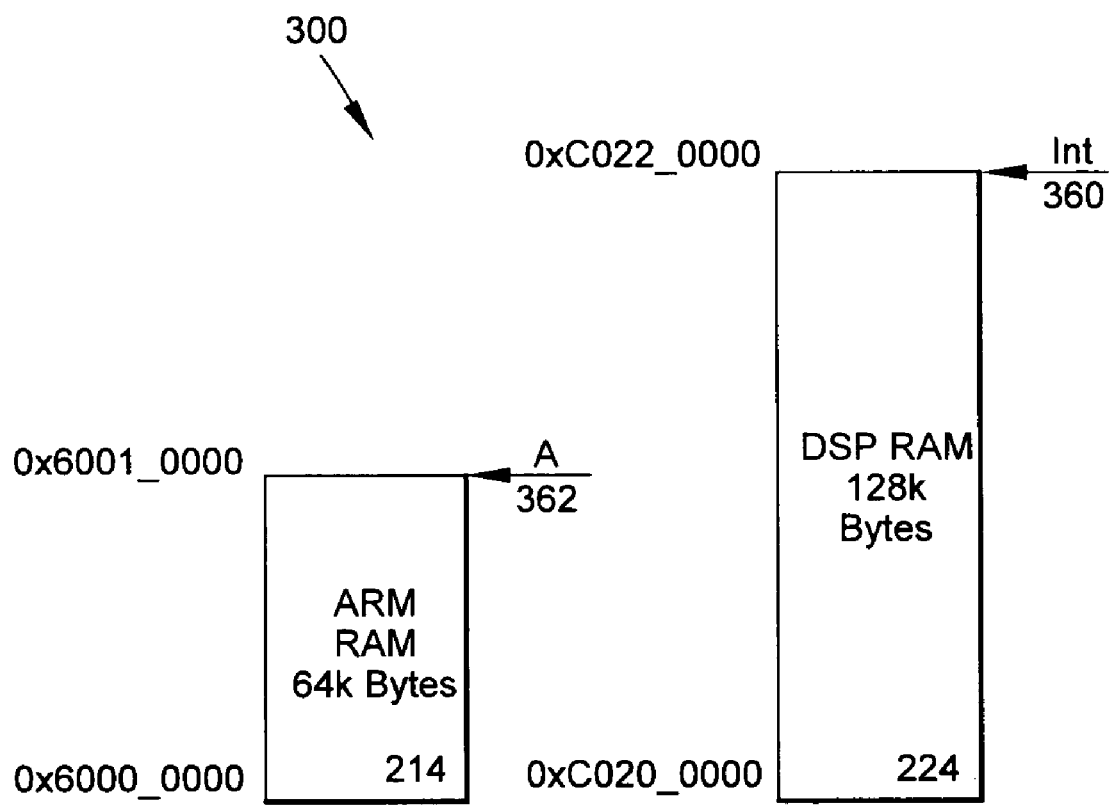
FIG. 3 is a block diagram of a core memory configuration following start/boot-up of the host electronic system, under the embodiment of FIG. 2.

FIG. 3 is a block diagram 300 of a memory configuration following start/boot-up of the electronic system 200, under the embodiment of FIG. 2. At system start, also referred to as boot-up, the processor memory 24 includes 64 kilobytes (kbytes) of memory (as configured by a processor memory map) while the DSP memory 224 includes 128 kbytes of memory (as configured by a DSP memory map). The processor 212 sees the processor memory 214 at a base address of 0x6000_0000, but alternative embodiments can assign any base address to the processor memory 214 as appropriate to the memory type. Likewise, the DSP 222 sees the DSP memory 224 at a base address of 0xC020_0000, but alternative embodiments can assign any base address to the DSP memory 224 as appropriate to the memory type.

As described herein, the memory sharing of an embodiment supports the processor 212 reading to and writing from the DSP memory 224. Consequently, the processor 212 can see the DSP memory 224 through the DSP bridge 232 at system boot-up. The processor sees the DSP memory 224 at a base address of 0xC020_0000, for example, but alternative embodiments can use any base address for the DSP memory 224.

The memory of an embodiment includes memory protection features to alert the host system when the processor 212 and/or the DSP 222 attempt to access memory locations of their respective memories that are beyond address boundaries corresponding to a particular memory configuration. The memory protection features include, but are not limited to, interrupt generation using an interrupt address boundary Int 360 and abort generation using an abort address boundary A 362. The memory protection features are described below with reference to the memory reallocation examples.

In operation when the processor 212 requires additional memory for storage of processor data, the processor 212 can reallocate at least one area or set of memory locations of the DSP memory 224 for use in storing processor data. Generally, two methods of reallocating the DSP memory 224 are available. A first reallocation method uses at least one memory map to map prespecified addresses from the DSP memory address space to the processor memory address space through the DSP bridge 232. This first reallocation method is referred to herein as the mapping reallocation method. The mapping of memory through the DSP bridge 232 supports the incremental reallocation of as many as eight blocks of memory, where each block includes up to approximately 8 kbytes, but the embodiment is not so limited. Access to the reallocated memory by the processor 212 is made via the DSP bridge 232, the DSP bus 204, and components (not shown) of the DSP 222.

A second reallocation method switches prespecified memory addresses from the DSP memory address space of the DSP bus 204 to the processor bus 202. This second reallocation method is referred to herein as the switching reallocation method. The switching reallocation method also uses memory mapping to place reallocated memory into contiguous processor memory address space. However, as described further below, this mapping is performed via a memory interface (described below with reference to FIGS. 8 and 10) coupled directly to the processor bus 202, thereby supporting relatively faster access to the reallocated memory than the mapping reallocation method. The switching reallocation method supports the reallocation of a block of memory, where the block includes up to approximately 32 kbytes, but the embodiment is not so limited.

Additional reallocation methods and configurations can be realized from combinations of the mapping and switching reallocation methods using the descriptions provided herein. An example is described below of a system configuration that uses both the mapping and switching reallocation methods, but the alternative embodiments are not limited to this configuration.

Figure 4:
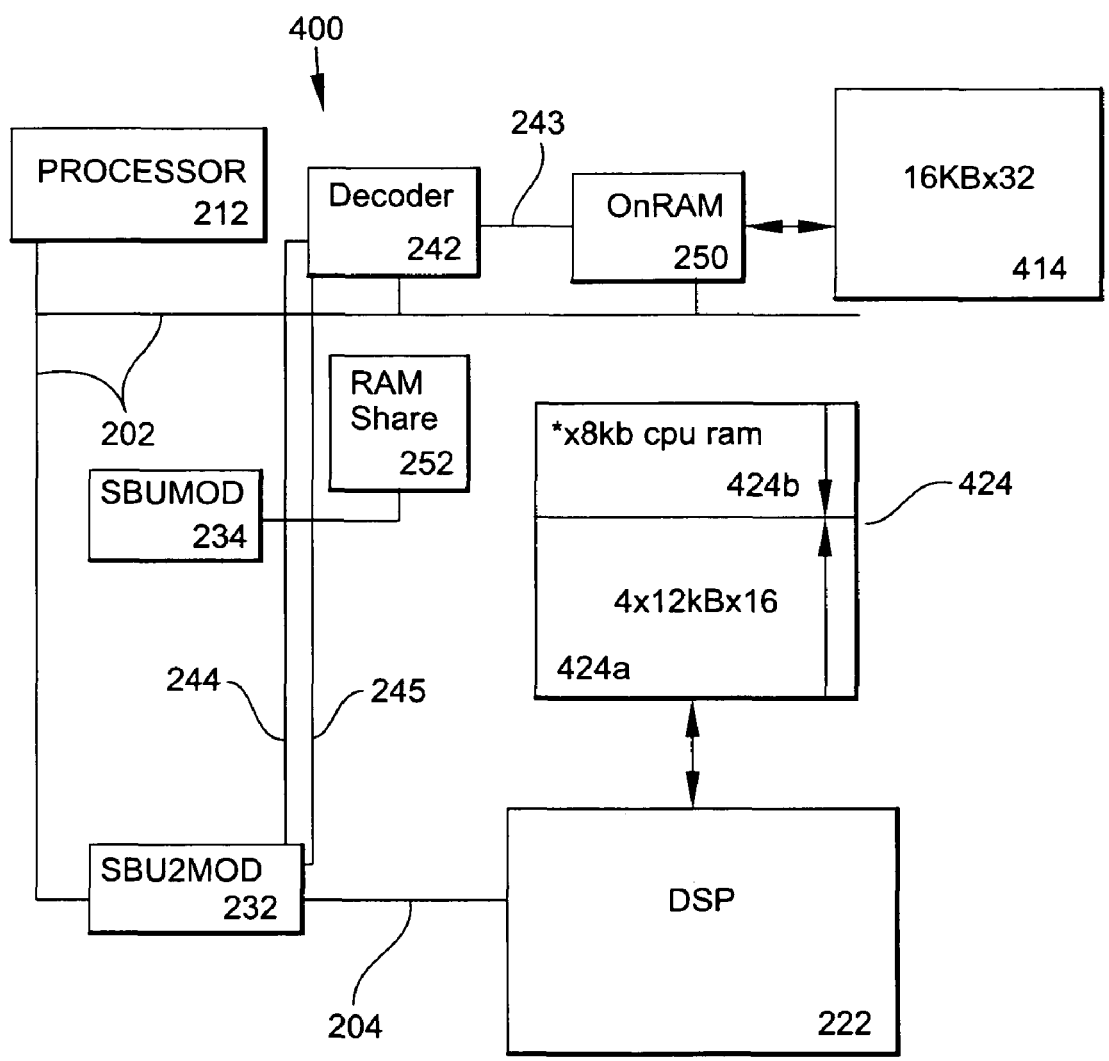
FIG. 4 is a block diagram of an electronic system including a memory that is partitioned for sharing between the central processor and the DSP, under the embodiment of FIG. 2.

As described above, the core memory sharing of an embodiment allows the processor 212 to dynamically reallocate or reconfigure some portion of the DSP memory 224 for use in storing data of the processor 212 using mapping reallocation. The mapping reallocation includes a system configuration in which prespecified memory locations of the DSP memory 224 are mapped through the DSP bridge 232 for access by the processor 212 via the DSP bus 204 and the DSP 222. FIG. 4 is a block diagram of an electronic system configuration 400 that reallocates some portion of the DSP memory 424b for use by the processor 212 via the DSP bridge 232 and DSP bus 204, under the embodiment of FIG. 2.

Figure 5A:
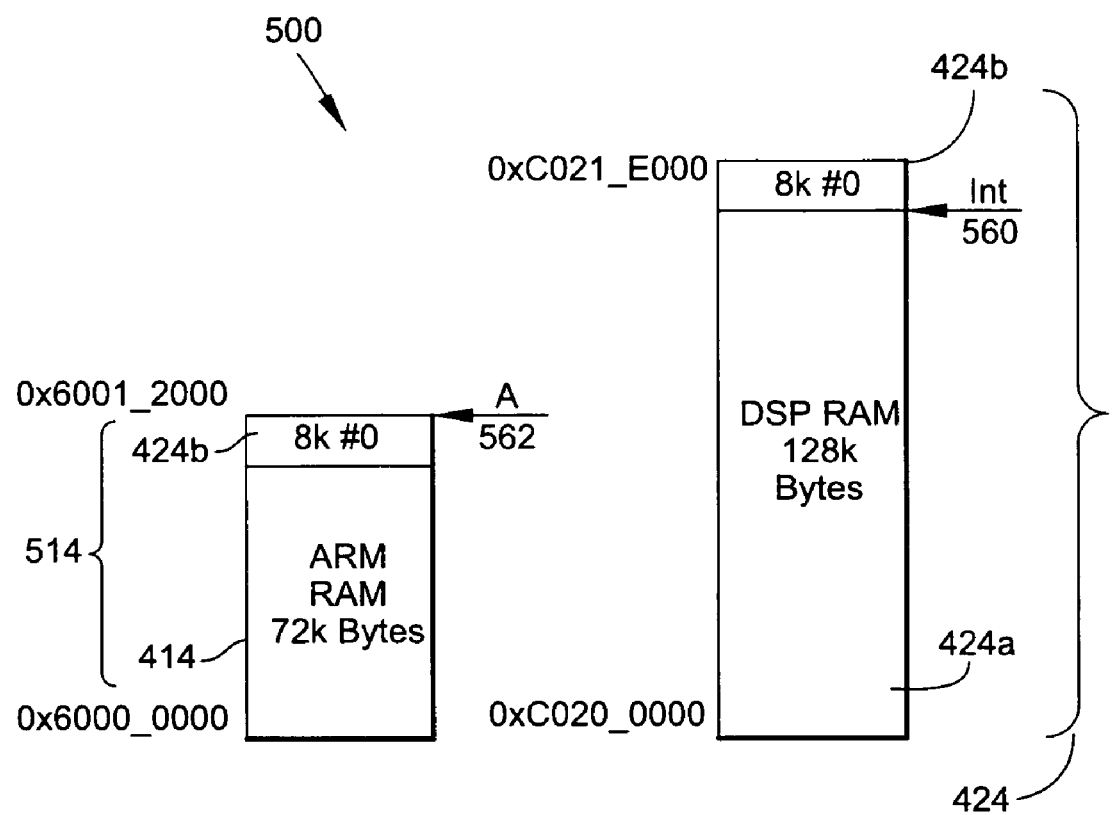
FIG. 5A is a block diagram of a memory configuration in which a first block of DSP memory is reallocated from the DSP address space to the processor address space using mapping reallocation, under the embodiment of FIG. 4.
Figure 6A:
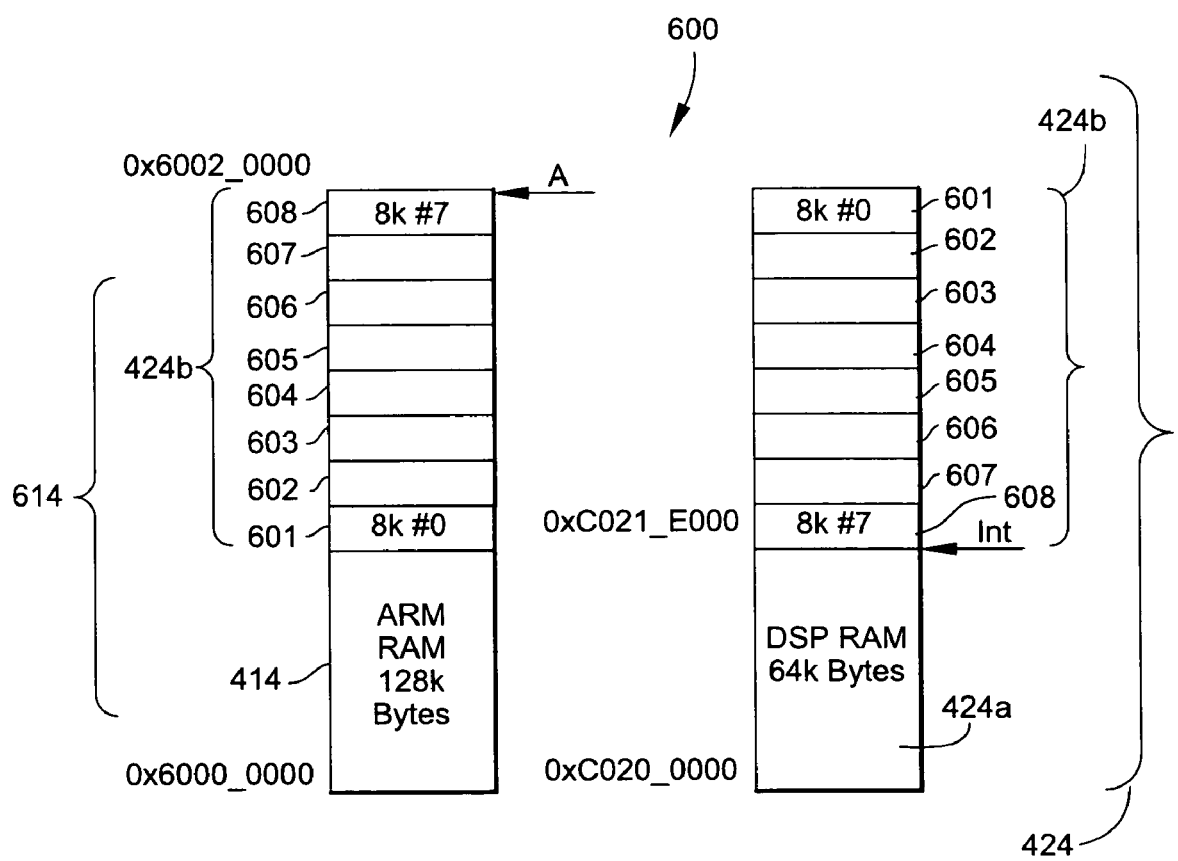
FIG. 6A is a block diagram of a memory configuration in which a number n of memory blocks of DSP memory are reallocated from the DSP address space to the processor address space using mapping reallocation, under the embodiment of FIG. 4.

Generally, the system 400 uses at least one memory map to map prespecified addresses or blocks 424b from the DSP memory address space 424 to the processor memory address space 414 through the DSP bridge 232. The reallocation of the DSP memory 424b is performed in response to information of the configuration register 252, as described below. The reallocation of an embodiment supports the incremental reallocation of as many as eight blocks of memory, where each block includes up to approximately 8 kbytes of memory, but the embodiment is not so limited. FIG. 5A is a block diagram 500 of memory reallocation in which a block of DSP memory 424b is reallocated from the DSP address space 424 to the processor address space 414 through the bridge unit, under the embodiment of FIG. 4. FIG. 6A is a block diagram 600 of memory reallocation in which a block of DSP memory 424b that includes a number n (where n equals eight in this example) of memory blocks is reallocated from the DSP address space 424 to the processor address space 414 through the bridge unit, under the embodiment of FIG. 4.

Figure 5B:
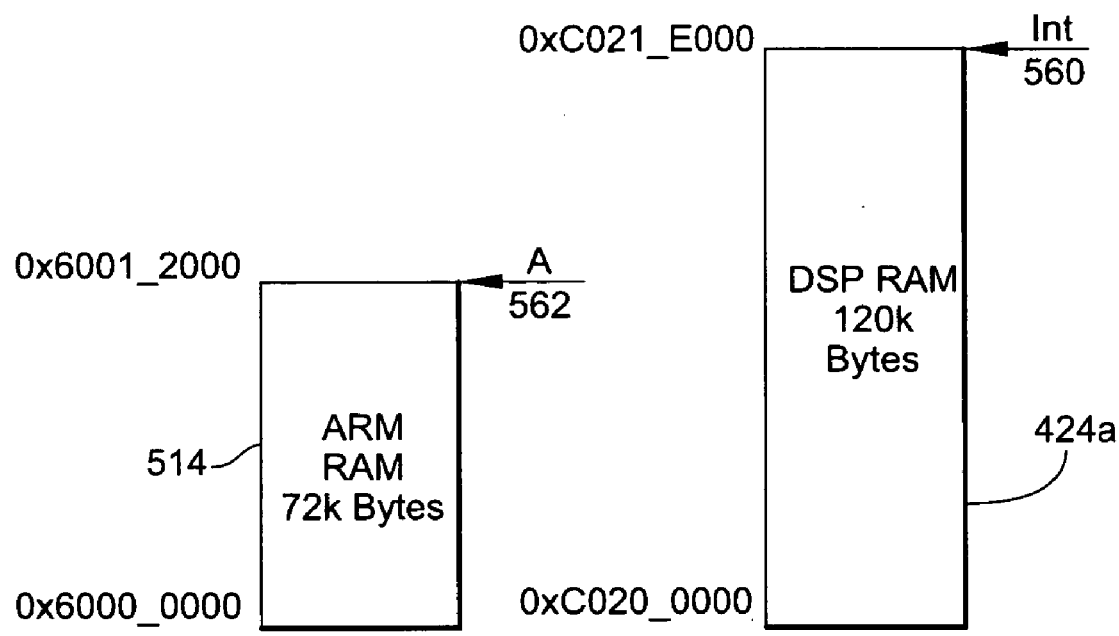
FIG. 5B shows a memory configuration (memory map) following reallocation of an 8-kbyte block of DSP memory from the DSP address space to the processor address space, under the embodiment of FIG. 5A.

With reference to FIG. 5A, this mapping example shows the reallocation of an 8-kbyte memory block 424b from the DSP memory 424 to the processor memory 414. The starting memory configuration of this example, with reference to FIG. 3, includes 128 kbytes of DSP memory 424 and 64 kbytes of processor memory 414, but memory of any configuration can be reallocated as described herein. Upon reallocation, a memory block 424b (8 kbytes) is removed from the top of DSP memory 424, so that the DSP now sees a contiguous block of memory 424a that is approximately 120 kbytes in size (128 kbytes−8 kbytes=120 kbytes). The reallocated memory block 424b is added to the core processor memory 414, and the processor now sees a contiguous block of memory 514 that is approximately 72 kbytes in size (64 kbytes+8 kbytes=72 kbytes). FIG. 5B shows a memory configuration (memory map) following reallocation of the 8-kbyte block of DSP memory from the DSP address space 424 to the processor address space 414, under the embodiment of FIG. 5A. While the embodiment described reallocates 8-kbyte memory blocks, alternative embodiments can reallocate memory blocks of different sizes or combinations of memory blocks having different sizes.

The memory of an embodiment includes memory protection features to alert the host system when the processor and/or the DSP attempt to access memory locations of their respective memories that are beyond address boundaries corresponding to a particular memory configuration. The memory protection features include aborts and interrupt flags, but are not so limited. Consequently, the address boundaries for the memory protection features are adjusted during the memory reallocation.

As an example, the system of an embodiment generates an interrupt flag if the DSP accesses memory locations beyond a prespecified interrupt address boundary or limit that corresponds to the current memory configuration. Thus, the system adjusts the interrupt address boundary as appropriate during the memory reallocation. Returning to the example described above with reference to FIG. 5, the interrupt address boundary Int 560 is adjusted to an incrementally lower address in the DSP memory 424 to reflect removal of the memory block 424b from the DSP memory 424. Alternative embodiments can adjust the interrupt address boundary to an incrementally higher address in the DSP memory 424 or as otherwise appropriate to the memory addressing scheme.

As another example, the system of an embodiment generates an abort if the processor accesses memory locations beyond a prespecified abort address boundary that corresponds to the current memory configuration. Thus, the system adjusts the abort address boundary as appropriate during the memory reallocation. Returning to the example described above with reference to FIG. 5, the abort address boundary A 562 is adjusted to an incrementally higher address in the processor memory 514 to reflect the addition of the memory block 424b to the core processor memory 414. Alternative embodiments can adjust the abort address boundary to an incrementally lower address in the memory or as otherwise appropriate to the memory addressing scheme.

Figure 6B:
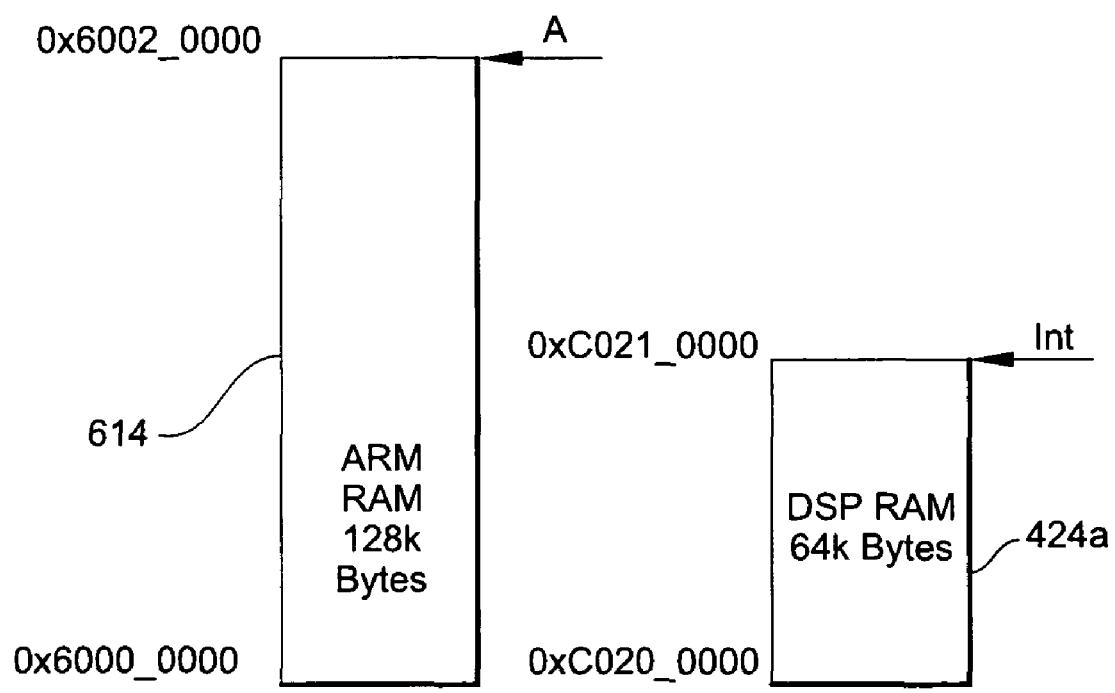
FIG. 6B shows a memory configuration (memory map) following reallocation of a 64-kbyte block of DSP memory from the DSP address space to the processor address space, under the embodiment of FIG. 6A.

Continuing with memory reallocation examples, and with reference to FIG. 6A, an alternative embodiment of memory reallocation reallocates a memory block 424b that includes eight 8-kbyte memory blocks 601-608 (64 kbytes). The starting memory configuration of this example, with reference to FIG. 3, includes 128 kbytes of DSP memory 424 and 64 kbytes of processor memory 414, but memory of any configuration can be reallocated as described herein. The memory block 424b is removed from the top of the DSP memory 424 and reallocated to the core processor memory 414, so that the DSP now sees a contiguous block of memory 424a that is approximately 64 kbytes in size (128 kbytes−64 kbytes=64 kbytes). The reallocated memory block 424b is added to the core processor memory 414, and the processor now sees a contiguous block of memory 614 that is approximately 128 kbytes in size (64 kbytes+64 kbytes=128 kbytes). The interrupt and abort address boundaries are adjusted as appropriate to the memory addressing scheme as described above. FIG. 6B shows a memory configuration (memory map) following reallocation of the 64-kbyte block of DSP memory from the DSP address space 424 to the processor address space 414, under the embodiment of FIG. 6A. While the embodiment described reallocates a total of eight 8-kbyte memory blocks, alternative embodiments can reallocate different numbers of memory blocks where the memory blocks have the same and/or different sizes.

The memory blocks of an embodiment are mapped in order so that memory removed from the top of DSP memory 424 is added to the top of core processor memory 414. Therefore, the DSP memory address space is reduced from top to bottom, while the address space of the processor memory grows from bottom to top. Alternative embodiments, however, can use alternative mapping schemes as known in the art.

The memory reallocation supports access to the reallocated portions of the DSP memory 424b by the processor 212 via the DSP bridge 232, the DSP bus 204, and the DSP 222. Information of the processor 212 is routed to the reallocated DSP memory 424b under control of the decoder 242. Referring again to FIG. 4, the decoder 242 receives information from the processor via the processor bus 202. The received information includes for example instructions and/or data along with associated memory addresses. The decoder uses the first four bits of the address to determine whether the associated information on the processor bus 202 is GPS data or processor data.

Figure 7:
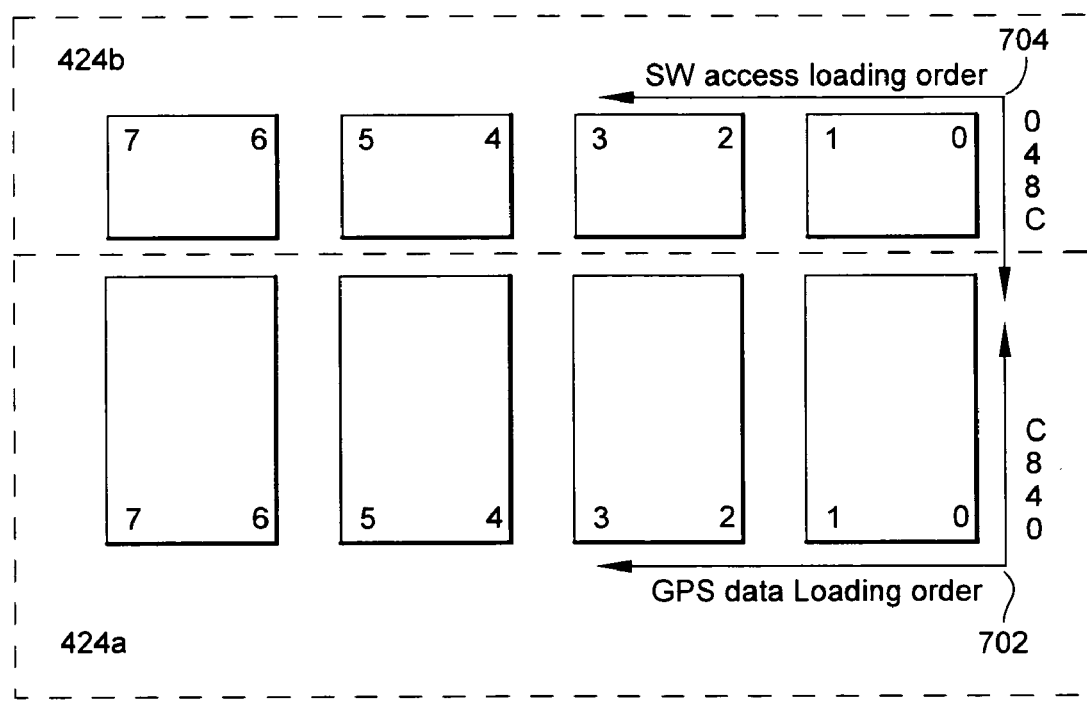
FIG. 7 is a block diagram of a memory area following partitioning and reallocation along with the associated memory loading orders, under the embodiment of FIG. 4.

When the decoder 242 determines the information (data) on the bus 202 is GPS data, the decoder 242 selects the DSP bridge 232 (using control line 244) to read/receive the GPS data. Upon being selected by the decoder 242 via control line 244, some combination of components (not shown) of the DSP bridge 232 and the DSP 222 route the GPS data from the processor bus 202 to the appropriate memory locations of the DSP memory. FIG. 7 is a block diagram of the DSP memory following memory reallocation along with the associated memory loading orders 702 and 704, under the embodiment of FIG. 4. The GPS data of an embodiment is written to the DSP memory 424a in accordance with the GPS data loading order 702.

When the decoder 242 determines that received information (data) is processor data, the decoder 242 selects either the memory controller 250 or the DSP bridge 232 to read/receive the processor data via control line 243 or control line 245, respectively, in accordance with an address decoding scheme as follows. When the address falls between 6000_0000 and 6001_0000, the decoder 242 selects the processor memory 414 (using control line 243) to receive the associated information over the processor bus 202 and the memory controller 250. When the address falls between 6001_0000 and 6002_0000, the decoder 242 selects the reallocated block 424b of the DSP memory (using control line 245) to receive the associated information via the DSP bus 204 and some combination of components (not shown) of the DSP bridge 232 and the DSP 222. Various alternative embodiments can use any number of signaling lines/techniques to select the DSP bridge 232 and/or the memory controller 250 instead of the control lines 244 and 245.

When the decoder 242 selects the reallocated block 424b of the DSP memory to receive the associated information (processor data) on the processor bus 202, the decoder 242 selects the DSP bridge 232 using control line 245 to read/receive the processor data. Upon being selected by the decoder 242, the DSP bridge 232 processes and routes the processor data from the processor bus 202 to the appropriate memory locations of the reallocated DSP memory 424b. Processing of the data by the DSP bridge 232 includes, for example, inverting the address of the data, but the embodiment is not so limited. Referring again to FIG. 7, the processor data of an embodiment is written to the reallocated GPS memory 424b in accordance with the SW access loading order 704.

As described above, the core memory sharing of an embodiment also includes switching reallocation. Switching reallocation switches prespecified memory addresses from the DSP memory address space of the DSP bus 204 to the processor bus 202. This reallocation method also uses memory mapping to place reallocated memory into contiguous processor memory address space. However, this mapping is through a memory interface that provides faster access to the reallocated memory relative to mapping through the DSP bridge 232 described above.

Figure 8:
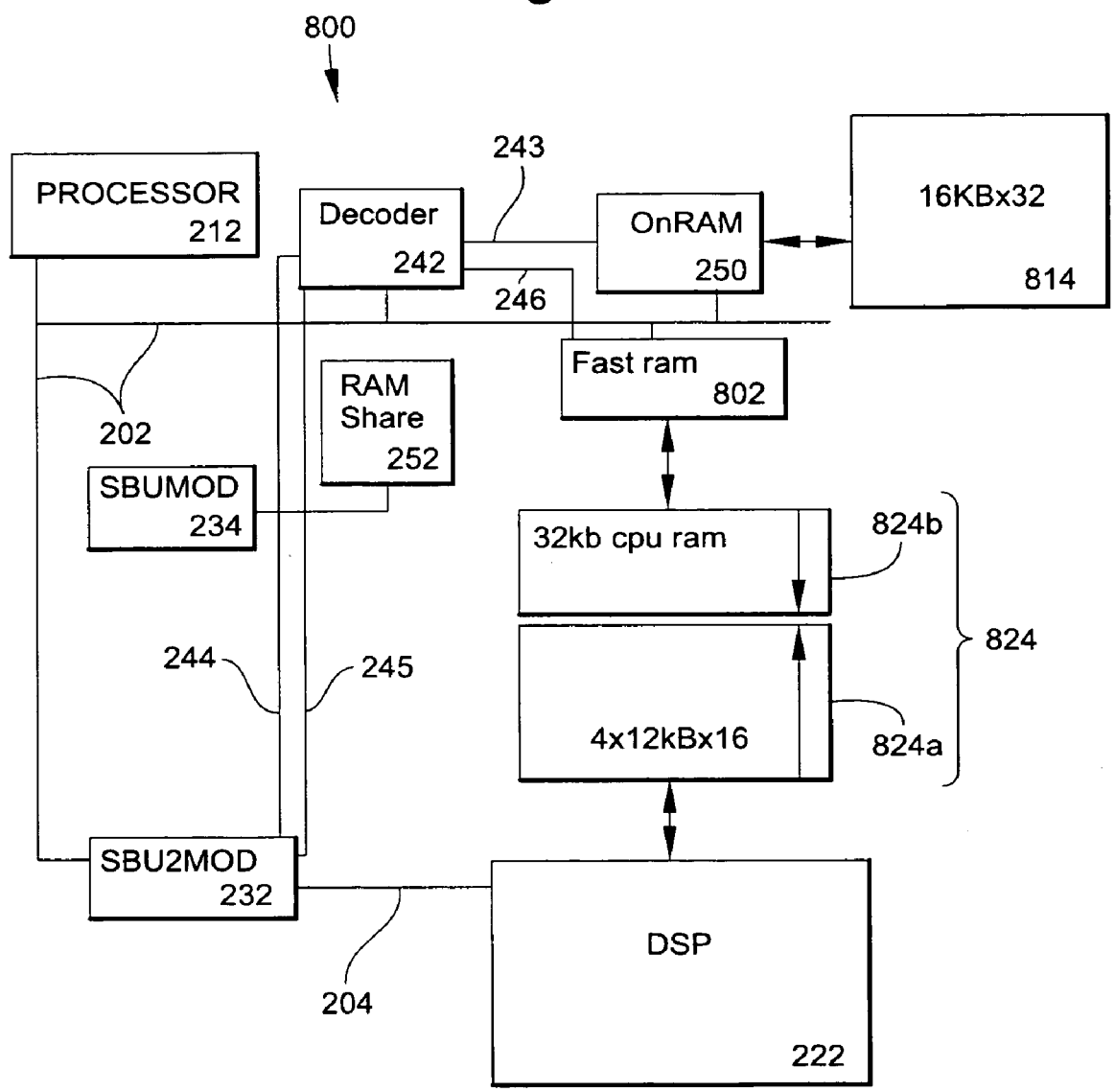
FIG. 8 is a block diagram of an electronic system configuration that reallocates some portion of memory associated with the DSP for use by the processor via switching reallocation, under an embodiment.

FIG. 8 is a block diagram of an electronic system configuration 800 that reallocates some portion of DSP memory 824 for use by the processor 212 using switching reallocation via a memory interface 802 and the processor bus 202, under an embodiment of FIG. 2. The system configuration 800 includes a memory interface 802 coupled to the processor bus 202. The memory interface 802 hosts at least one memory map (not shown), but is not so limited. Components of the memory interface 802 switch prespecified addresses or blocks 824b from the DSP memory address space 824 to the processor memory address space 814 through use of the memory map. The reallocation of the DSP memory 824b is performed in response to information of the configuration register 252, as described below. The reallocated memory 824b is accessed directly by the processor via the processor bus 202 and the memory interface 802 in a relatively small number of clock cycles compared to access via the DSP bus 204 and the DSP 222.

Figure 9A:
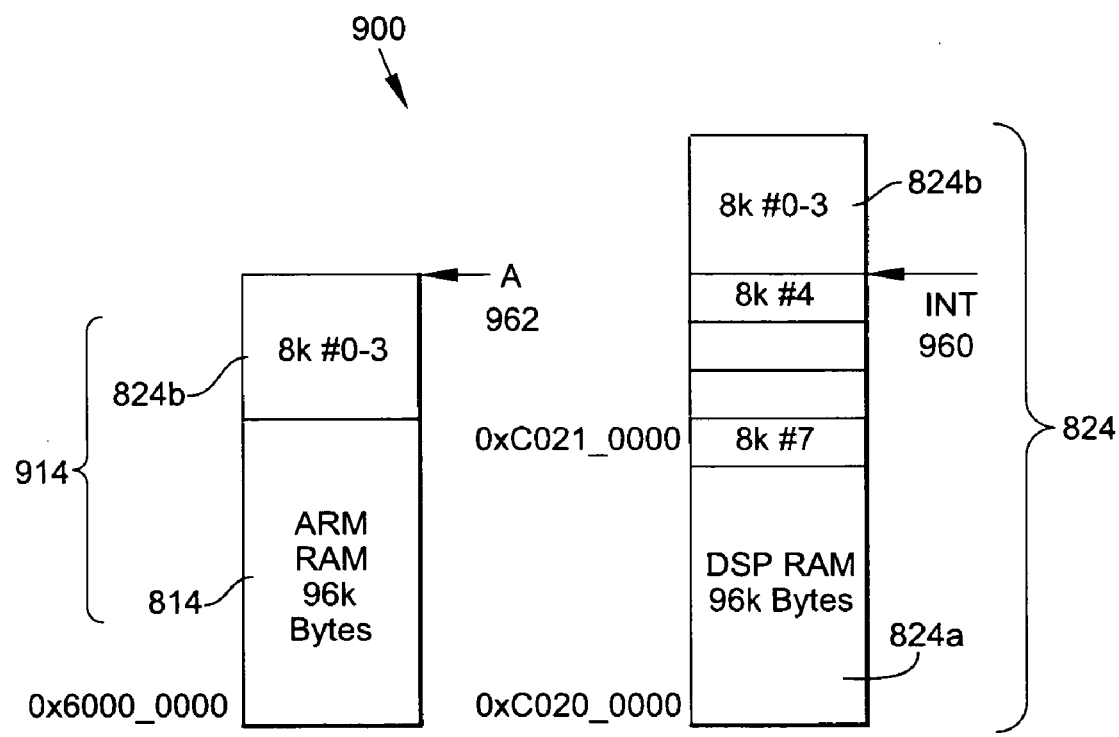
FIG. 9A is a block diagram of a memory configuration in which a block of DSP memory is reallocated from the DSP address space to the processor address space through the memory interface, under the embodiment of FIG. 8.

The reallocation of an embodiment supports the reallocation of a block of DSP memory 824b, where the DSP memory block 824*b* includes up to approximately 32 kbytes of memory, but the embodiment is not so limited. Alternative embodiments can reallocate any number of blocks having any number/combination of memory locations. FIG. 9A is a block diagram 900 of a memory configuration in which a block of DSP memory 824*b* is reallocated from the DSP address space 824 to the processor address space 814 through the memory interface, under the embodiment of FIG. 8.

Figure 9B:
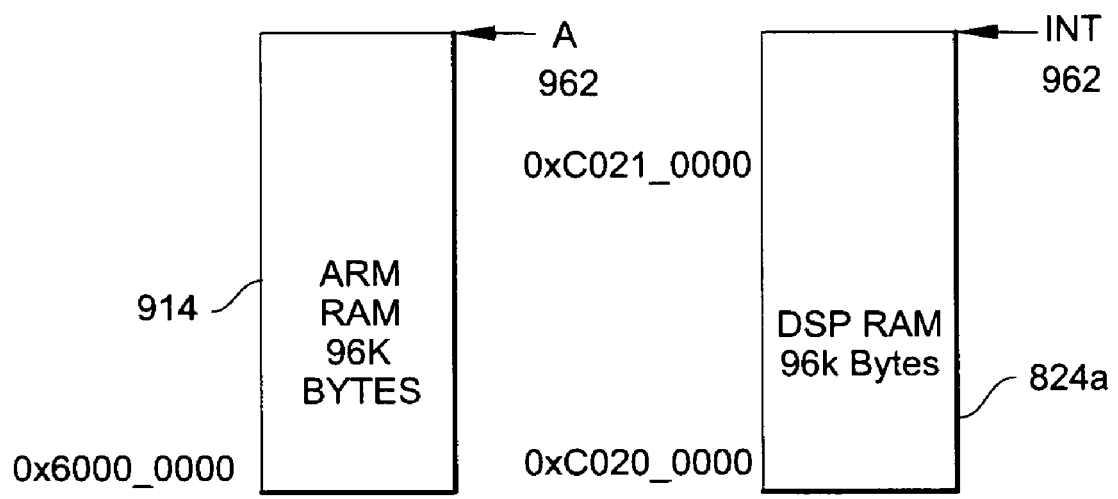
FIG. 9B shows a memory configuration (memory map) following reallocation of the 32-kbyte block of DSP memory from the DSP address space to the processor address space, under the embodiment of FIG. 9A.

With reference to FIG. 9A, the following mapping example demonstrates the reallocation of a 32-kbyte memory block 824*b*. The starting memory configuration of this example, with reference to FIG. 3, includes 128 kbytes of DSP memory 824 and 64 kbytes of processor memory 814, but memory of any configuration can be reallocated as described herein. Upon reallocation, the memory block 824*b* is removed from the top of the DSP memory 824, so that the DSP now sees a contiguous block of memory 824*a* that is approximately 96 kbytes in size (128 kbytes−32 kbytes=96 kbytes). The reallocated memory block 824*b* is added to the core processor memory 814, and the processor now sees a contiguous block of memory 914 that is approximately 96 kbytes in size (64 kbytes+32 kbytes=96 kbytes). FIG. 9B shows a memory configuration (memory map) following reallocation of the 32-kbyte block of DSP memory from the DSP address space 824 to the processor address space 814, under the embodiment of FIG. 9A. While the embodiment described reallocates a 32-kbyte memory block, alternative embodiments can reallocate one or more memory blocks of different sizes and/or combinations of memory blocks having different sizes.

The memory of an embodiment includes memory protection features to alert the host system when the processor and/or the DSP attempt to access memory locations of their respective memories that are beyond address boundaries corresponding to a particular memory configuration. The memory protection features include aborts and interrupt flags, but are not so limited. Consequently, the address boundaries for the memory protection features are adjusted during the memory reallocation. As described above with reference to FIGS. 5 and 6, the interrupt address boundary Int 960 is adjusted to an incrementally lower address in the DSP memory 824 to reflect removal of the memory block 824*b* from the DSP memory 824. Alternative embodiments can adjust the interrupt address boundary 960 to an incrementally higher address in the memory or as otherwise appropriate to the memory addressing scheme. Likewise, the abort address boundary A 962 is adjusted to an incrementally higher address in the processor memory 914 to reflect the addition of the memory block 824*b* to the core processor memory 814. Alternative embodiments can adjust the abort address boundary 962 to an incrementally lower address in the memory or as otherwise appropriate to the memory addressing scheme.

Figure 10:
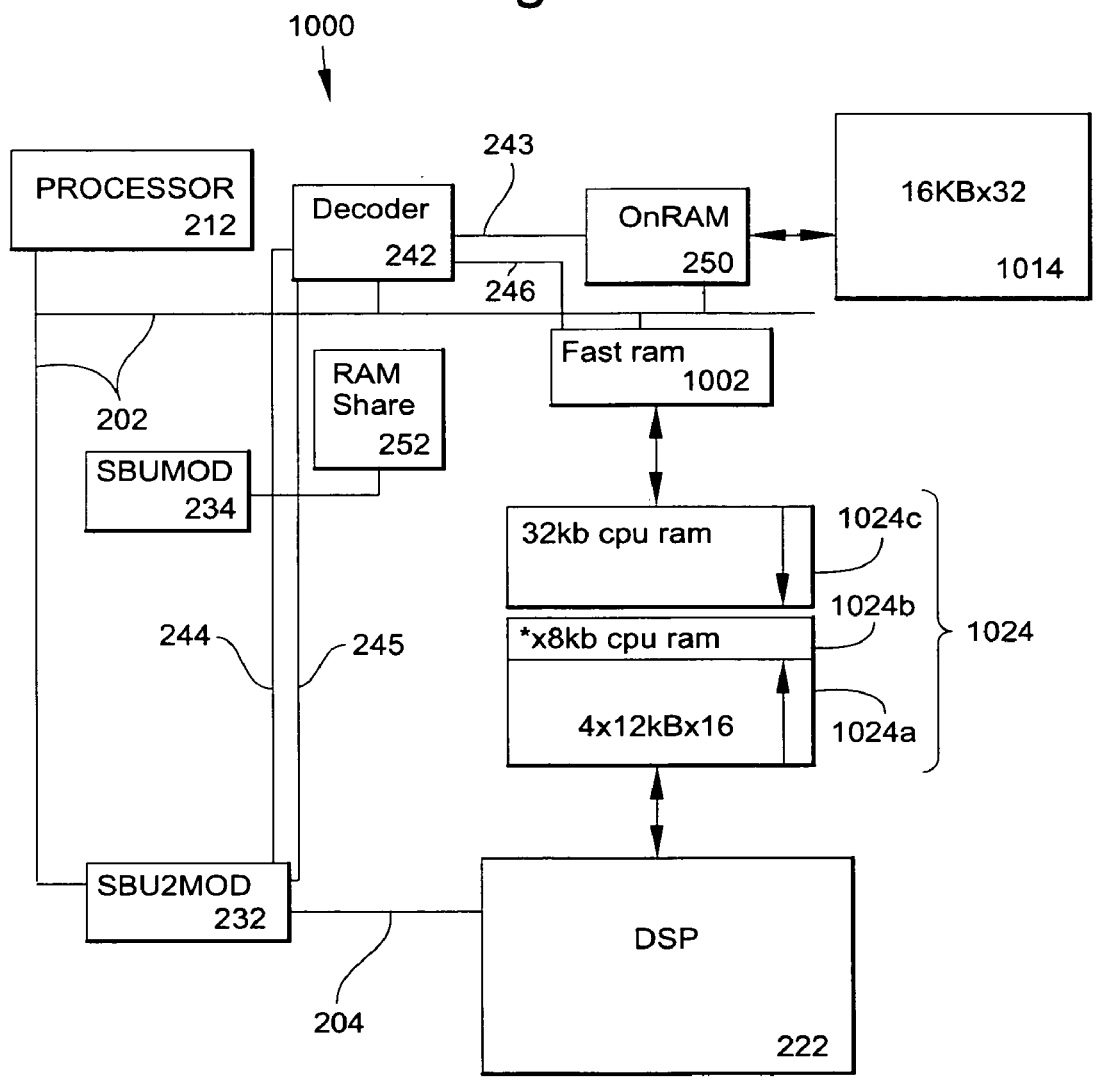
FIG. 10 is a block diagram of an example system configuration that reallocates a group or block of memory addresses using switching reallocation and another group of memory addresses using mapping reallocation, under the embodiments of FIG. 2, 4, and 8.

Numerous additional reallocation methods and configurations can be realized from combinations of the switching and/or mapping reallocation methods described above. For example, system configurations can reallocate memory using both switching and mapping reallocation in combination. FIG. 10 is a block diagram of an example system configuration 1000 that reallocates a group of DSP memory addresses 1024*c* using switching reallocation and another group of DSP memory addresses 1024*b* using mapping reallocation, under the embodiments of FIGS. 2, 4, and 8. Components of the system 1000 reallocate a first portion 1024*c* of DSP memory for use by the processor 212 via a memory interface 1002 and the processor bus 202, and reallocate a second portion 1024*b* of DSP memory for use by the processor 212 via the DSP bridge 232 and DSP bus 204, but are not so limited.

Referring first to the switching reallocation of the first block 1024*c* of DSP memory, the system configuration 1000 includes a memory interface 1002 coupled to the processor bus 202. The memory interface 1002 hosts at least one memory map (not shown), but is not so limited. Components of the memory interface 1002 switch prespecified addresses or blocks 1024*c* from the DSP memory 1024 to the core processor memory 1014 through use of the memory map. The reallocation of the first block 1024*c* of DSP memory supports the reallocation of as many as four blocks of memory, where each block includes up to approximately 8 kbytes of memory, but the embodiment is not so limited. The switching reallocation of the DSP memory 1024*c* is performed in response to information of the configuration register 252, as described below. The reallocated memory 1024*c* is accessed directly by the processor 212 via the processor bus 202 and the memory interface 1002.

Turning next to the mapping reallocation of the second block 1024*b* of DSP memory, the system configuration 1000 uses at least one memory map to map prespecified addresses or blocks 1024*b* from the DSP memory 1024 to the core processor memory 1014 through the DSP bridge 232. The reallocation of the DSP memory 1024*b* is performed in response to information of the configuration register 252, as described below. The reallocation of the second block 1024*b* of DSP memory, when done in combination with the switching reallocation of the first block 1024*c* supports the incremental reallocation of as many as four blocks of memory, where each block includes up to approximately 8 kbytes of memory, but the embodiment is not so limited.

Figure 11A:
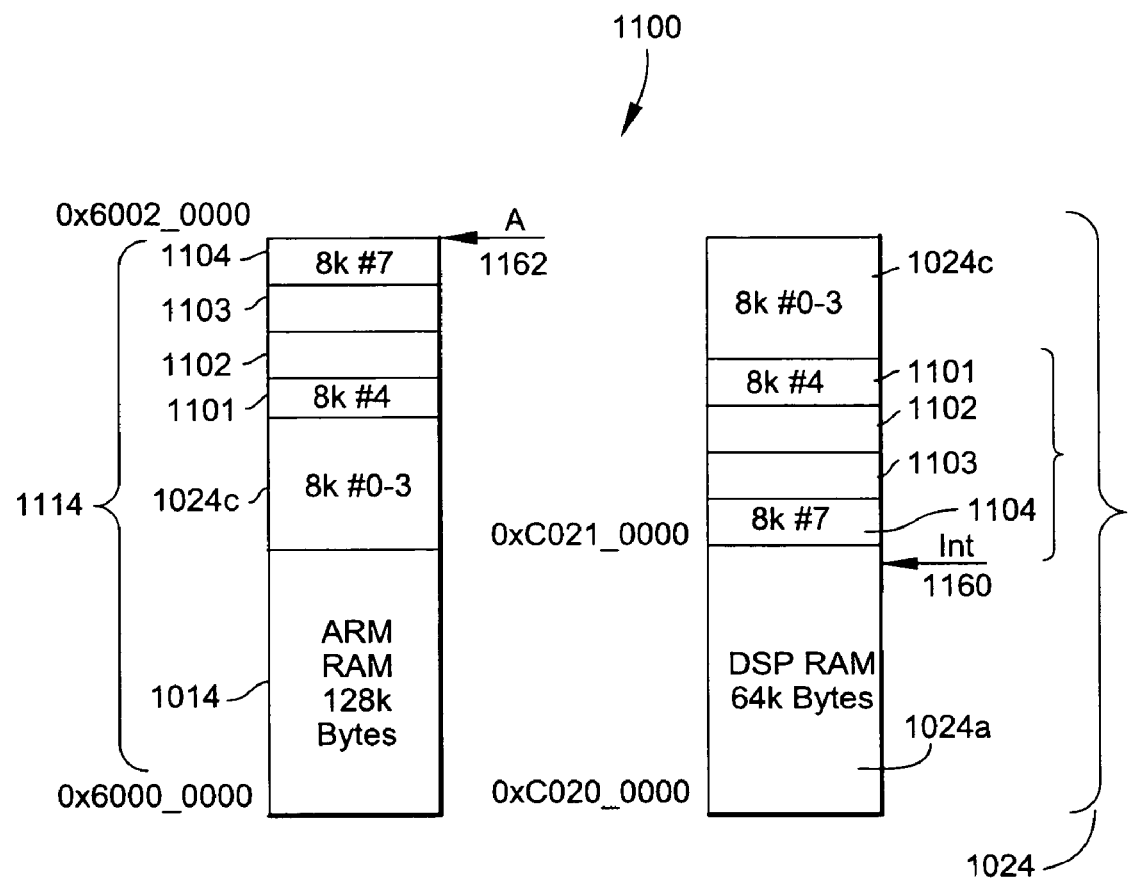
FIG. 11A is a block diagram of a memory configuration in which blocks of DSP memory are reallocated from the DSP address space to the processor address space using both switching and mapping reallocation, under the embodiment of FIG. 10.

FIG. 11A is a block diagram 1100 of a memory configuration in which blocks of DSP memory 1024*c* and 1024*b* are reallocated from the DSP address space 1024 to the core processor address space 1014 through the memory interface 1002 and the DSP bridge 232, respectively, under the embodiment of FIG. 10. The starting memory configuration of this example, with reference to FIG. 3, includes 128 kbytes of DSP memory 1024 and 64 kbytes of processor memory 1014, but memory of any configuration can be reallocated as described herein.

Reallocation of the first portion 1024*c* of DSP memory for use by the processor 212 via a memory interface 1002 and the processor bus 202 includes reallocating a 32-kbyte memory block 1024*c*. Upon reallocation, the memory block 1024*c* is removed from the top of the DSP memory 1024 using memory mapping through components of the memory interface, as described above.

Likewise, reallocation of the second block 1024*b* of DSP memory for use by the processor 212 via DSP bridge 232 includes reallocating four 8-kbyte memory blocks 1101-1104 (collectively 1024*b*). Upon reallocation, the memory block 1024*b* is removed from the DSP memory 1024 using memory mapping through components of the DSP bridge 232 and DSP 222, as described above.

Figure 11B:
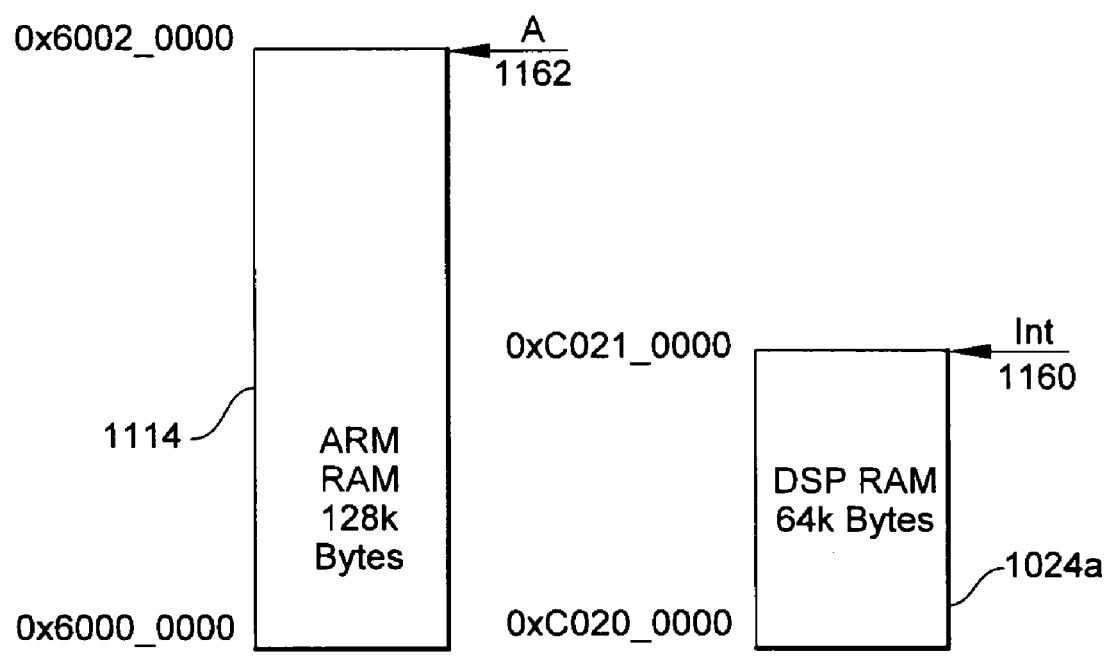
FIG. 11B shows a memory configuration (memory map) following reallocation of the first and second blocks of DSP memory from the DSP address space to the processor address space, under the embodiment of FIG. 11A.

Upon reallocation of the first 1024*c* and second 1024*b* blocks of DSP memory, the memory block 1024*c* (32 kbytes) is first removed from the top of core DSP memory 1024 and added to the top of the core processor memory 1014. The memory block 1024*b* (8 kbytes×4 blocks=32 kbytes) is next removed from the top of the remaining core DSP memory 1024 and added to the top of memory block 1024*c*. Following these two reallocation operations, the DSP 222 now sees a contiguous block of memory 1024*a* that is approximately 64 kbytes in size (128 kbytes−32 kbytes−32 kbytes=64 kbytes). The processor now sees a contiguous block of memory 1114 that is approximately 128 kbytes in size (64 kbytes+32 kbytes+32 kbytes=128 kbytes) as a result of the additions of reallocated memory blocks 1024c and 1024b to the core processor memory 1014. FIG. 11B shows a memory configuration (memory map) following reallocation of the first and second blocks of DSP memory from the DSP address space 1024 to the processor address space 1014, under the embodiment of FIG. 11A. Alternative embodiments can reallocate memory blocks of different sizes or combinations of memory blocks having different sizes.

Note that when reallocating DSP memory, switching the first portion 1024c of DSP memory takes priority over mapping the second portion 1024b of DSP memory, but the embodiment is not so limited. Consequently, when using the switching and mapping methods in combination, two situations can arise: the processor 212 maps one or more of the memory blocks 1101-1104 and subsequently switches one or more of the memory blocks 1101-1104; the processor 212 switches one or more of the memory blocks 1101-1104 and subsequently maps one or more of the memory blocks 1101-1104. Regardless of which of these two situations arise, existing data ordering is preserved when going between the mapping and the switching reallocation methods. Also, if the processor previously mapped one or more of the blocks 1101-1104 of the first portion 1024c of DSP memory to the core processor memory 1014 through the DSP bridge 232, any data stored in these blocks 1101-1104 remains intact at the same addresses when the block is later mapped to the core processor memory 1014 through the memory interface.

As described above with reference to FIGS. 5, 6, and 9, the interrupt address boundary Int 1160 is incrementally adjusted to a lower address in the DSP 1024 memory to reflect removal of memory blocks 1024c and 1024b from the DSP memory 1024. Alternative embodiments can incrementally adjust the interrupt address boundary 1160 to a higher address in the memory or as otherwise appropriate to the memory addressing scheme. Likewise, the abort address boundary A 1162 is incrementally adjusted to a higher address in the memory to reflect the addition of memory blocks 1024c and 1024b to the core processor memory 1014. Alternative embodiments can incrementally adjust the abort address boundary 1162 to a lower address in the memory or as otherwise appropriate to the memory addressing scheme.

The system configuration 1000 that combines memory switching and memory mapping reallocation supports access to the switched portions 1024c of the DSP memory by the processor 212 via the processor bus 202 and the memory interface 1002, while supporting access to the mapped portions 1024b of the DSP memory via the DSP bridge 232, the DSP bus 204, and the DSP 222. Information (data) of the processor 212 is routed to the appropriate memory locations under control of the decoder 242. Referring again to FIG. 10, the decoder 242 receives information (data) from the processor 212 via the processor bus 202. The received information includes for example data and/or instructions along with associated memory addresses. The decoder 242 uses the first four bits of the address to determine whether the associated information is GPS data or processor data.

Figure 12:
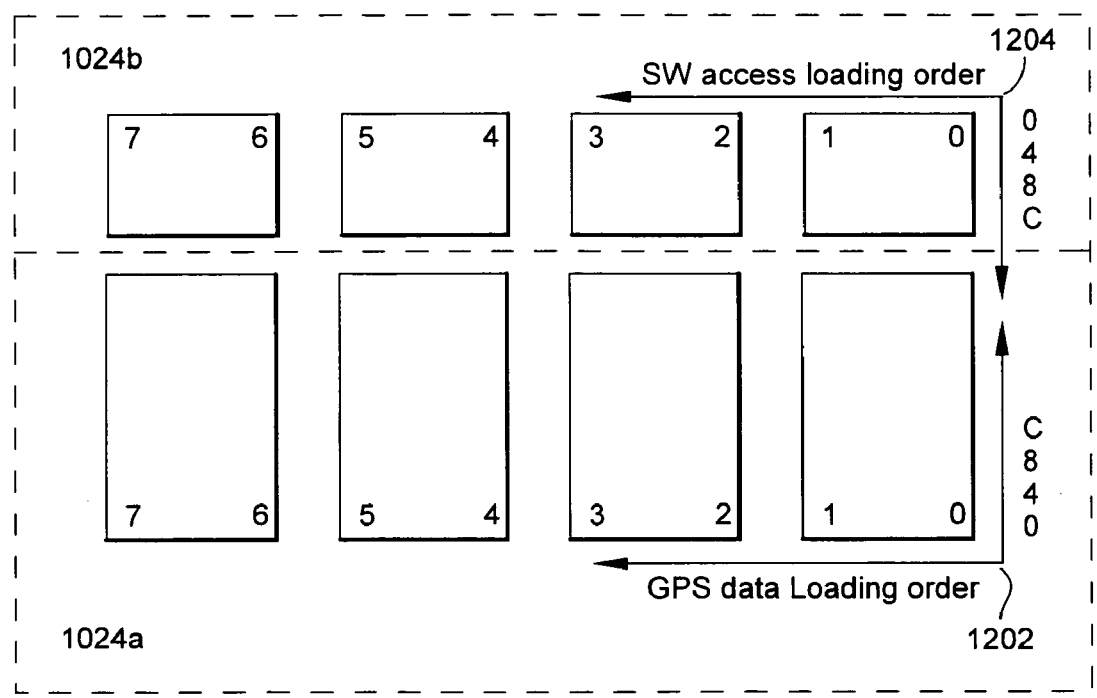
FIG. 12 is a block diagram of a memory area following partitioning and reallocation along with the associated memory loading orders, under the embodiment of FIG. 10.

When the decoder 242 determines the information (data) is GPS data, the decoder 242 selects the DSP bridge 232 (using control line 244) to read/receive the GPS data. Upon being selected by the decoder 242 via control line 244, some combination of components (not shown) of the DSP bridge 232 and the DSP 222 route the GPS data from the processor bus 202 to the appropriate memory locations 1024a of the DSP memory. FIG. 12 is a block diagram of the DSP memory following memory reallocation along with the associated memory loading orders 1202 and 1204, under the embodiment of FIG. 10. The GPS data of an embodiment is written to the GPS memory 1024a in accordance with the GPS data loading order 1202.

When the decoder 242 determines that received information (data) is processor data, the decoder 242 selects one of the memory controller 250, the DSP bridge 232, or the memory interface 1002 to read/receive the processor data via control line 243, control line 245, or control line 246, respectively, in accordance with an address decoding scheme as follows. When the address falls between 6000_0000 and 6001_8000 and the memory configuration includes switched memory 1024c, the decoder selects the switched memory 1024c (using control line 246) to receive the associated information over the processor bus 202 and the memory interface 1002. When the address falls between 6001_8000 and 6002_0000 and the memory configuration includes switched memory 1024c, the decoder selects the mapped block 1024b of the DSP memory 1024 (using control line 245) to receive the associated information via the DSP bus 204 and some combination of components (not shown) of the DSP bridge 232 and the DSP 222. Various alternative embodiments can use any number/type/combination of signaling schemes to select the device to read/receive the processor data instead of the control lines 243-246.

When the decoder 242 selects the mapped block 1024b of the DSP memory to receive the associated information on the processor bus 202, the decoder 242 selects the DSP bridge 232 using control line 245 to read/receive the processor data. Upon being selected by the decoder 242, the DSP bridge 232 processes and routes the processor data from the processor bus 202 to the appropriate memory locations of the reallocated DSP memory 1124b. Processing of the data by the DSP bridge 232 includes, for example, inverting the address of the data, but the embodiment is not so limited. Referring again to FIG. 12, the processor data of an embodiment is written to the reallocated GPS memory 1024b in accordance with the SW access loading order 1204.

Figure 13:
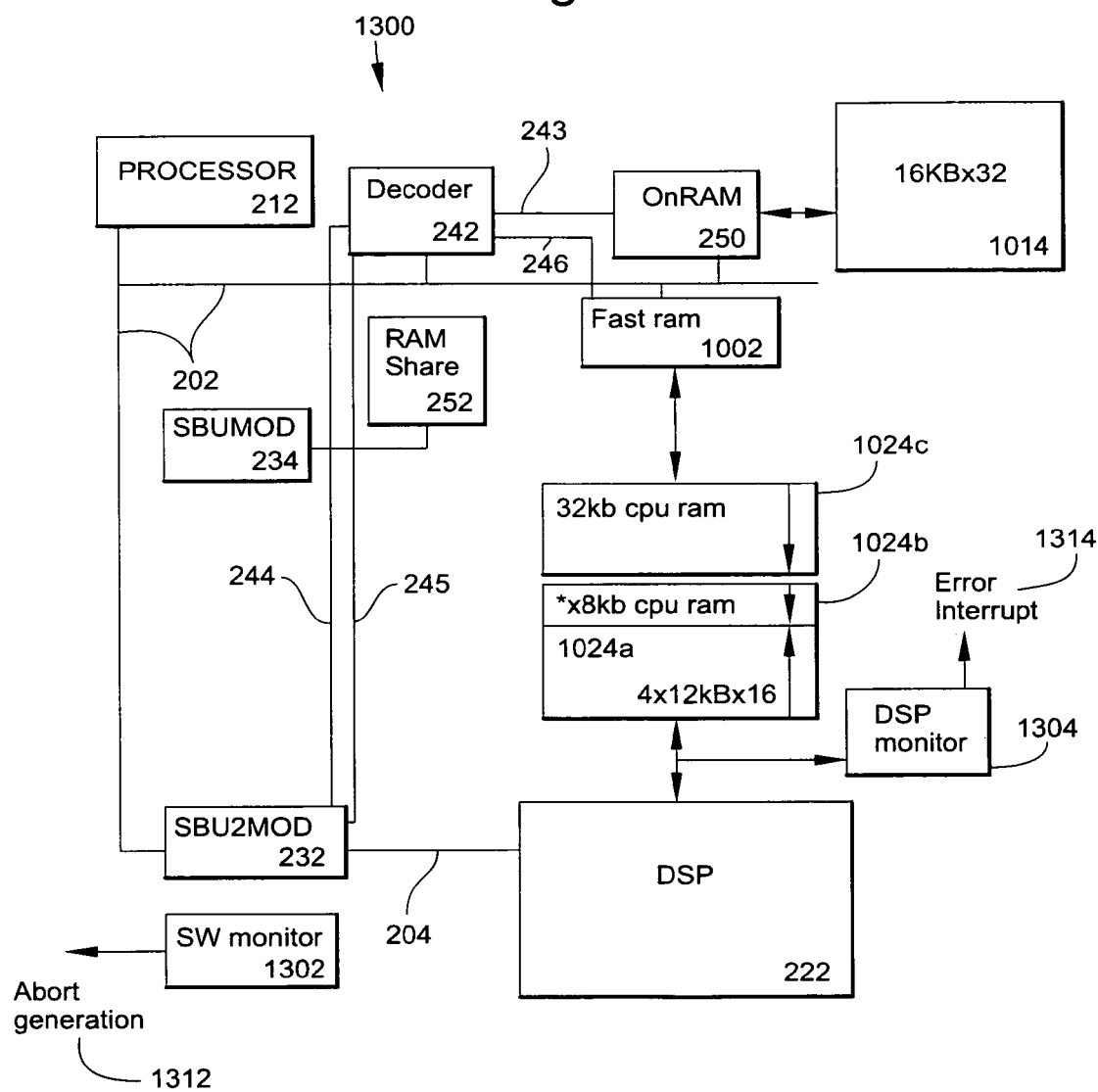
FIG. 13 is a block diagram of a system configuration that reallocates a group of memory addresses using switching reallocation and another group of memory addresses using mapping reallocation, under an alternative embodiment of FIG. 10.

As described above, the memory of an embodiment includes memory protection features to alert the host system when the processor 212 and/or the DSP 222 attempt to access memory locations of their respective memories that are beyond address boundaries corresponding to a particular memory configuration. These memory protection features include aborts and interrupt flags, for example. FIG. 13 is a block diagram of a system configuration 1300 that reallocates a group of memory addresses using switching reallocation and another group of memory addresses using mapping reallocation, under an alternative embodiment of FIG. 10. This system 1300 further includes a SW monitor 1302 coupled to the DSP bridge 232, but is not so limited. The SW monitor 1302 generates an abort 1304 if the processor 212 accesses memory locations beyond a prespecified abort address boundary associated with the memory configuration, as described above. The system 1300 adjusts at least one abort address boundary as appropriate to the memory configuration.

The system 1300 also includes a DSP monitor 1304 coupled to at least one of the DSP 222 and the DSP memory 1024. The DSP monitor 1304 of an embodiment generates an interrupt 1314 if the DSP 222 accesses memory locations beyond a prespecified interrupt address boundary or limit associated with the memory configuration, as described above. The system 1300 adjusts at least one interrupt address boundary as appropriate to the memory configuration.

Figure 14:
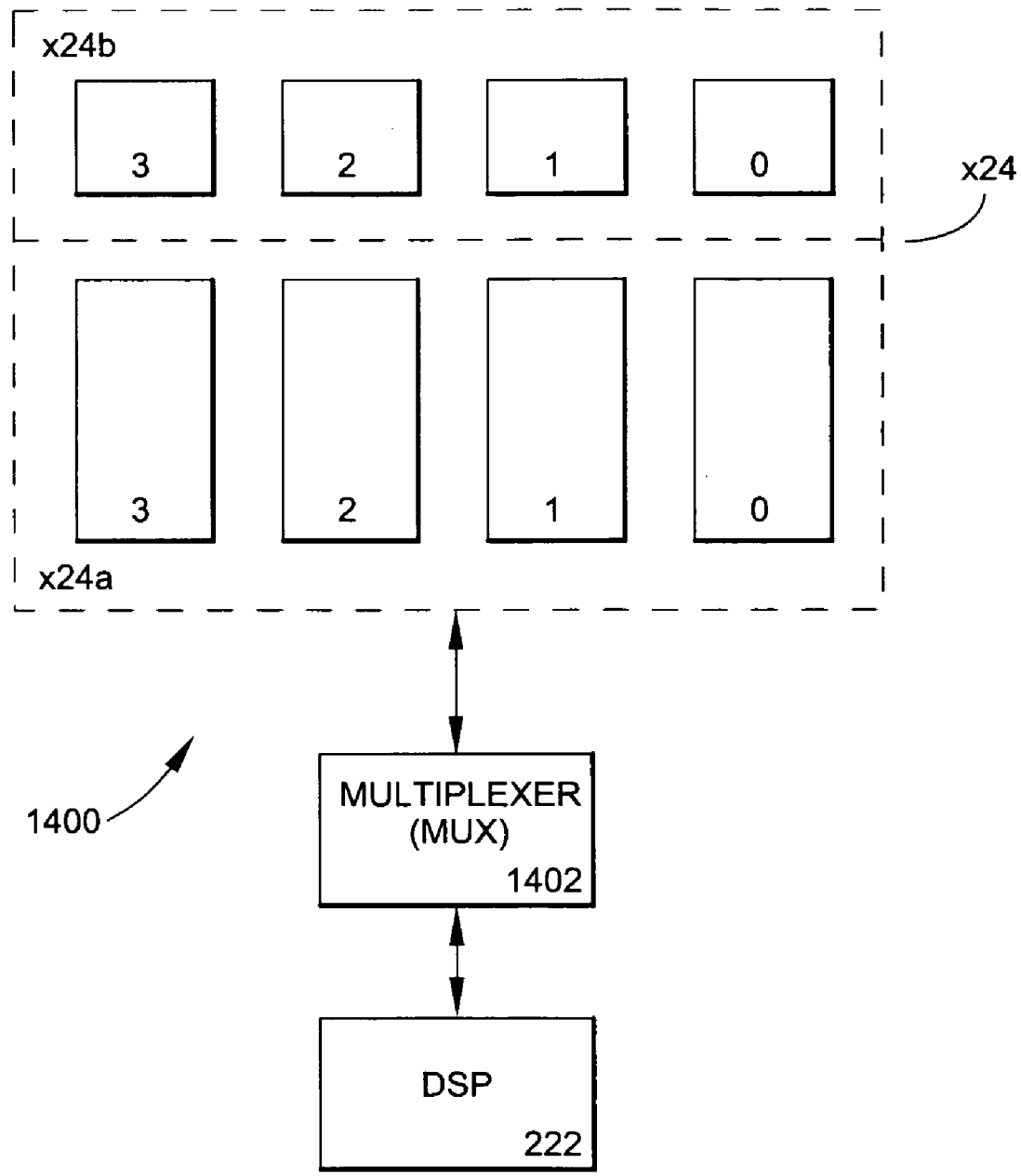
FIG. 14 is a block diagram of an electronic system including a reallocated memory and a multiplexer, under any of the embodiments of FIGS. 4, 8, and 10.

The system configurations described above with reference to FIGS. 2, 4, 8, and 10 can also include a multiplexer for use in accessing the DSP memory. As an example, FIG. 14 is a block diagram of an electronic system 1400 including a reallocated memory X24 and a multiplexer 1402, under any of the embodiments of FIGS. 2, 4, 8, and 10. The multiplexer 1402 is coupled to the memory X24 (where "X" represents the number of the corresponding figure/system: FIG. 2, "memory 224"; FIG. 4, "memory 424"; FIG. 8, "memory 824"; FIG. 10, "memory 1024") and the DSP 222, but is not so limited. The memory X24 includes DSP memory X24a, and reallocated memory block X24b. The reallocated memory block X24b is reallocated for use by the processor 212 (FIGS. 2, 4, 8, and 10) as described above.

During write operations to the memory X24, the DSP 222 transfers information to the multiplexer 1402 including address and memory chip select information (0, 1, 2, or 3). Alternative embodiments can provide additional information to the multiplexer 1402. Using the address and chip selected information, the multiplexer 1402 selects memory locations of one of memory block X24a or X24b for the write operation.

During memory read operations, the DSP 222 provides information to the multiplexer 1402 that includes but is not limited to address information. In response, the multiplexer 1402 receives data from memory locations of each of memory blocks X24a and X24b corresponding to the address information. The multiplexer uses the address information to select either the information read from memory block X24a or the information read from memory block X24b, and provides the selected information to the DSP 222.

Access to all processor memory and DSP memory described above allows byte, half-word, and word access with byte line write controls. This attribute holds both for switched memory and for memory mapped through the bridge unit. Byte ordering for the DSP memory is the same for either the DSP base-address, or the mapped or switched blocks that use the processor base-address.

The memory sharing/reallocation described above can involve a number of components or modules of the host electronic system. The systems described above with reference to FIGS. 2-14 include at least one memory configuration register 252 coupled to the processor bus 202. The memory configuration register 252 couples to the processor bus 202 via a bridge unit 234 and includes registers that store information for use by at least one of the processor 212, a decoder 242, a memory interface (FIG. 8, 802; FIG. 10, 1002), a DSP bridge 232, and a multiplexer (FIG. 14; 1402) in controlling or managing the memory configuration. The memory configuration register 252, either alone and/or in combination with other components of the host electronic system, generally includes one or more registers/register fields described below.

The configuration register 252 of an embodiment includes a first set of register fields to support mapping reallocation, as described above. This set of register fields map memory blocks from the DSP address space to the processor address space. The memory blocks include up to eight 8-kbyte blocks, but alternative embodiments can include any number of blocks having any combination of sizes. The blocks are mapped in order from the top of the DSP memory. The first set of register fields of an embodiment includes one or more register fields.

The configuration register 252 of an embodiment includes a second set of register fields to support switching reallocation, as described above. This second set of register fields support switching the top 32 kbytes of DSP memory from the DSP bus to the processor bus, wherein the 32-kbyte block includes four 8-kbyte blocks. If one or more of the corresponding four 8-kbyte blocks of memory were previously or are subsequently reallocated using mapping reallocation, the switch control takes precedence. Data contents of the first four mapped 8 kbyte blocks and the single switched 32-kbyte block are at identical offsets and byte ordering with either reallocation method. The second set of register fields of an embodiment includes one or more register fields.

The configuration register 252 of an embodiment includes a third set of register fields to support enabling or disabling abort generation for DSP memory read and/or write access violations. Generation of these aborts can also be independently enabled or disabled for read and write accesses. Regarding interrupts, the system of an embodiment includes a fourth set of register fields to support saving of an address that causes the initial DSP memory violation and subsequent interrupt. Each of the third and fourth set of register fields of an embodiment includes one or more register fields.

FIG. 15 is a block diagram of a control register 1500 for memory sharing, under an embodiment. The configuration register 252 includes the control register 1500, but alternative embodiments can include the control register 1500 in other components and/or combinations of components of the host system. A description of the function of the bits 0-15 of this register is as follows:

| Bit(s) | Function |
| --- | --- |
| 15:7 | Reserved |
| 6 | DSP32K_SWI_ENB: Logic 1 = enable processor direct access of the upper 32 kbytes of DSP memory through the processor bus. |
| 5:3 | MAP_BLK[2:0]: 000-111 selects from one to eight 8-kbyte blocks of the upper 64 kbytes of DSP memory for processor soft mapping access when DSP64K_MAP_ENB = 1. These bits set the processor soft MAP address boundary as follows:<br>000: $\geq$ 0x6001_0000 < 0x6001_2000 or $\geq$0xC021_E000 < 0xC022_0000<br>001: $\geq$ 0x6001_0000 < 0x6001_4000 or $\geq$0xC021_C000 < 0xC022_0000<br>010: $\geq$ 0x6001_0000 < 0x6001_6000 or $\geq$0xC021_A000 < 0xC022_0000<br>011: $\geq$ 0x6001_0000 < 0x6001_8000 or $\geq$0xC021_8000 < 0xC022_0000<br>100: $\geq$ 0x6001_0000 < 0x6001_A000 or $\geq$0xC021_6000 < 0xC022_0000<br>101: $\geq$ 0x6001_0000 < 0x6001_C000 or $\geq$0xC021_4000 < 0xC022_0000<br>110: $\geq$ 0x6001_0000 < 0x6001_E000 or $\geq$0xC021_2000 < 0xC022_0000<br>111: $\geq$ 0x6001_0000 < 0x6002_0000 or $\geq$0xC021_0000 < 0xC022_0000. |
| 2 | DSP64K_MAP_ENB: Logic 1 = enable processor soft mapping from one to eight 8-kbyte blocks of the upper 64 kbytes of DSP memory at addresses at or greater than 0x6001_0000 and less than 0x6002_0000 through the DSP bus bridge. |
| 1 | EN_CPU_WAB: Logic 1 = enable abort on processor write violation. |
| 0 | EN_CPU_RAB: Logic 1 = enable abort on processor read violation. |

A more detailed explanation of control bits of the control register 1500 follows. The EN_CPU_RAB bit enables the processor 212 to abort the access if it attempts to read from DSP memory in an address range that is not allowed because it is mapped for processor use or not physically present on the bus being accessed. For example, if SWI_ENB=0 and MAP_ENB=1 and the processor 212 tries to read from the address range 0x6001_C000 to 0x6001_FFFF, an abort is generated. Similarly, if SWI_ENB=1 and the processor 212 tries to read from the range 0xC021_E000 to 0xC021_FFFF, an abort is generated. Note, however, that if SWI_ENB=0 and MAP_ENB=1 and MAP_BLK is greater than/equal to 000, the processor 212 may read from block 0 through the DSP bridge

232 at both address ranges 0x600__0000 to 0x6001__1FFF and 0xC021_E000 to 0xC021_FFFF.

The EN_CPU_WAB bit enables the processor 212 to abort the access if it attempts to write to DSP memory in an address range that is not allowed because the particular address range is mapped for processor use or not physically present on the bus being accessed. For example, if SWI_ENB=0 and MAP_ENB=1 and the processor 212 tries to write to the address range 0x6001_C000 to 0x6001_FFFF, an abort is generated. Similarly, if SWI_ENB=1 and the processor 212 tries to write to an address in the range 0xC021_E000 to 0xC021_FFFF, an abort is generated because the block is not present on the DSP bus. Note, however, that if SWI_ENB=0 and MAP_ENB=1 and MAP_BLK is greater than/equal to 000, the processor 212 may write to block 0 through the DSP bridge 232 at both address ranges 0x6001__0000 to 0x6001__1FFF and 0xC021_E000 to 0xC021_FFFF.

The DSP64K_MAP_ENB bit enables MAP_BLK [2:0] to control the address mapping of eight 8-kbyte blocks from the DSP address range to the address range directly above the on-chip processor memory. When this bit is disabled (set to logic "0"), the mapping bits MAP_BLK [2:0] have no effect.

The MAP_BLK [2:0] bit controls the mapping of eight 8-kbyte blocks from the DSP address range to the address range directly above the on-chip processor memory. The bytes are mapped beginning with block zero and ending with the block specified by MAP_BLK [2:0], but are not so limited. Block 0 is at the high end of the DSP address range and is mapped to the low end of the mapped range above the processor memory. This reverse stacking is done so that the remaining DSP memory is a contiguous address range as upper blocks are removed, and the added processor memory grows upward with each added block so as to appear as a contiguous address range.

The DSP32K_SWI_ENB bit switches memory blocks 0 to 3 from the DSP bus to the processor bus. The four blocks are stacked in reverse order in the processor address range, beginning with block 0 being mapped just above the top of on-chip processor memory. This same mapping is used when MAP_BLK [2:0] maps the blocks via the DSP bridge 232.

FIG. 16 is a block diagram of a status register 1600 for memory sharing, under an embodiment. The configuration register 252 includes the status register 1600, but alternative embodiments can include the status register 1600 in other components and/or combinations of components of the host system. A description of the function of the bits 0-15 of this register is as follows:

| Bit(s) | Function |
| --- | --- |
| 15:2 | Reserved. |
| 1 | CPUW_VIO: during read operations, a logic 1 = processor write-violation; during write operations, writing a logic 1 clears the bit. |
| 0 | CPUR_VIO: during read operations, a logic 1 = processor read-violation; during write operations, writing a logic 1 clears the bit. |

A more detailed explanation of each control bit of the status register 1600 follows. The CPUR_VIO bit is set when processor read-violations occur. This bit is set independently of the state of EN_CPU_RAB. The CPUR_VIO bit is cleared when the processor writes back a logic "1".

The CPUW_VIO bit is set when processor write-violations occurs. This bit is set independently of the state of EN_CPU_WAB. The CPUW_VIO bit is cleared when the processor writes back a logic "1".

FIG. 17 is a block diagram of a read/write violation address register 1700 for memory sharing, under an embodiment. The configuration register 252 includes the violation address register 1700, but alternative embodiments can include the violation address register 1700 in other components and/or combinations of components of the host system. A description of the function of the bits 0-15 of this register is as follows:

| Bit(s) | Function |
| --- | --- |
| 15:0 | DSP address first causing DSPW_INT or DSPR_INT pulse. |

FIGS. 18A and 18B form an address map 1800 for memory sharing, under an embodiment. The configuration register 252 includes the address map 1800, but alternative embodiments can include the address map 1800 in other components and/or combinations of components of the host system. Some examples are presented below of the address mapping for memory sharing, but the embodiment is not limited to these examples.

In a first example, Block=7, DSP32K_SWI_ENB=X, DSP64K_MAP_ENB=0, MAP_BLK [2:0]=XXX. The DSP 222 accesses the block in its DSP address range 0x0001__0000 to 0x0001_FFFF. The processor 212 accesses the block at the DSP bridge address of 0xC021__0000 to 0xC021__1FFF. The processor 212 can not access this block on the processor bus 202.

In a second example, Block=7, DSP32K_SWI_ENB=X, DSP64K_MAP_ENB=1, MAP_BLK [2:0]=110. The DSP 222 accesses the block in its DSP address range 0x0001__0000 to 0x0001_FFFF. The processor 212 accesses the block at its DSP bridge address of 0xC021.0000 to 0xC021_FFFF or the soft map address 0x6001__0000 to 0x6001__5FFF. The processor 212 can not access this block on the processor bus 202.

In a third example, Block=7, DSP32K_SWI_ENB=X, DSP64K_MAP_ENB=1, MAP_BLK [2:0]=111. The DSP 222 is not programmed to access the block in the general DSP address range 0x0001__0000 to $0x_{0001}$_FFFF. The processor 212 accesses the block at its mapped DSP bridge address of 0x6001__0000 to 0x6001__7FFF. The processor 212 does not access this block on the processor bus 202. If the DSP 222 tries to access this block in its general DSP bus address range, DSP read or write interrupts are generated as appropriate.

Aspects of the memory sharing/reallocation of an embodiment may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the memory sharing of an embodiment include: microcontrollers with memory (such as electronically erasable programmable read only memory (EEPROM)), embedded microprocessors, firmware, software, etc. Furthermore, aspects of the memory sharing of an embodiment may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used herein, shall refer to this patent as a whole and not to any particular portions of this patent. When the word "or" is used in reference to a list of two or more items, that word covers all of the following interpretations of the word: any of the items in the list, all of the items in the list and any combination of the items in the list.

The above description of illustrated embodiments of the memory sharing is not intended to be exhaustive or to limit the invention to the precise form disclosed. While specific embodiments of, and examples for, the memory sharing are described herein for illustrative purposes, various equivalent modifications are possible within the scope of the invention, as those skilled in the relevant art will recognize. The teachings of the memory sharing provided herein can be applied to other electronic systems, not only for the electronic systems described above.

The elements and acts of the various embodiments described above can be combined to provide further embodiments. These and other changes can be made to the memory sharing of an embodiment in light of the above detailed description.

All of the above references and United States Patents and patent applications are incorporated herein by reference. Aspects of the embodiments described herein can be modified, if necessary, to employ the systems, functions and concepts of the various patents and applications described above to provide yet further embodiments of the memory sharing.

In general, in the following claims, the terms used should not be construed to limit the memory sharing to the specific embodiments disclosed in the specification and the claims, but should be construed to include all electronic systems that operate under the claims to provide memory sharing. Accordingly, the memory sharing is not limited by the disclosure, but instead the scope of the memory sharing is to be determined entirely by the claims.

While certain aspects of the memory sharing are presented below in certain claim forms, the inventors contemplate the various aspects of the memory sharing in any number of claim forms. For example, while only one aspect of the memory sharing is recited as embodied in computer-readable medium, other aspects may likewise be embodied in computer-readable medium. Accordingly, the inventors reserve the right to add additional claims after filing the application to pursue such additional claim forms for other aspects of the memory sharing.

What we claim is:

1. An electronic system comprising:

a first memory area coupled for access by a first processor via a first bus, the first bus having a plurality of bus sections separately branching from the first processor, wherein each bus section has a first end connected to the first processor and a second end opposite the first end, wherein the second end of one bus section is connected to the first memory area, and the second end of at least one other bus section bypasses and so is not connected to the first memory area;

a second memory area coupled for access by a second processor;

a second bus, the second bus having a first portion connected to the second processor for providing access to the second memory area via the second processor and a second portion connected to the second end of the at least one other bus section of the first bus that bypasses the first memory area;

at least one memory configuration that supports shared access of the second memory area by the first and second processors, wherein the at least one configuration includes access by the first processor to a first set of memory locations of the second memory area via the second processor and the at least one other bus section of the first bus that bypasses the first memory area, and access by the second processor to a second separate set of memory locations of the second memory area; and at least one other memory configuration that supports direct access of the second memory area by the first processor and not via the second processor.

2. The system of claim 1, wherein the first processor is a central processor running in a first clock domain and the second processor is a digital signal processor (DSP) running in a second clock domain.

3. The system of claim 1, further comprising at least one decoder coupled to receive information on the first bus, wherein the at least one decoder uses at least one address of the information to select access to the first and the second memory areas.

4. The system of claim 3, wherein the at least one decoder selects the first memory area for access by data having an address in a first address range.

5. The system of claim 4, wherein the at least one decoder selects the second set of memory locations of the second memory area for access by data having an address in a second address range.

6. The system of claim 5, wherein the at least one decoder selects the first set of memory locations of the second memory area for access by data having an address in a third address range, wherein the third address range is a first subset of addresses of the second address range.

7. The system of claim 6, wherein the at least one decoder selects the first set of memory locations of the second memory area for access by data having an address in a fourth address range, wherein the fourth address range is a second subset of addresses of the second address range.

8. The system of claim 1, further comprising at least one configuration register that stores information including at least one memory configuration.

9. The system of claim 1, wherein the at least one memory configuration allows the first set of memory locations to be accessed at a speed associated with a clock speed of the first processor.

10. The system of claim 9, wherein the at least one memory configuration allows the second set of memory locations to be accessed at a speed associated with a clock speed of the second processor, wherein the clock speed of the first processor and the clock speed of the second processor are different.

11. The system of claim 1, further comprising at least one bridge unit that couples the first bus and the second bus, wherein access by the first processor to the second set of memory locations of the second memory area via the second bus includes mapping the second set of memory locations to the first memory area through the at least one bridge unit.

12. The system of claim 1, further comprising at least one memory interface that couples to the first bus and the second memory area, wherein access by the first processor to the first set of memory locations of the second memory area via the first bus includes mapping the first set of memory locations to the first memory through the at least one memory interface.

13. The system of claim 1, wherein the system is at least one of portable communication devices, portable position tracking devices, cellular telephones, cellular telephones coupled to position tracking devices, cellular telephones including position tracking devices, mobile electronic devices, mobile communication devices, personal digital assistants, and processor-based devices.

14. The system of claim 1, wherein the at least one memory configuration allows the first set of memory locations to be accessed at a speed associated with a clock speed of the second processor that is different from a clock speed of the first processor.

15. The system of claim 1, wherein the at least one memory configuration allows the first set of memory locations to be indirectly accessed by the first processor using no soft mapping of memory addresses of the second processor.

16. The system of claim 1, wherein the at least one memory configuration allows the first set of memory locations to be indirectly accessed by the processor through soft mapping of memory addresses of the second processor.

17. An electronic system for reallocation and sharing of memory among a plurality of processors in an embedded device, the system comprising:
   a first processor;
   a first bus having a plurality of bus sections separately branching from the first processor, each bus section having a first end connected to the first processor and a second end opposite the first end;
   a second processor;
   a second bus having a first portion connected to the second processor;
   a memory area coupled to the second processor, and configured to be accessed via the second processor, wherein the memory area has a first and a second set of memory locations configured to be accessed via the second processor;
   a bridge circuit for coupling a second portion of the second bus to the second end of one of the plurality of bus sections of the first bus; and
   a memory configuration circuit that supports shared access of the memory area by the first processor and the second processor, wherein the memory configuration circuit controls access by the first processor to the first set of memory locations via the second processor and the one of the plurality of bus sections of the first bus, and access by the second processor to the second set of memory locations, and wherein the memory configuration circuit further controls direct access of the memory area by the first processor and not via the second processor.

18. The system of claim 17, wherein the system is at least one of portable communication devices, portable position tracking devices, cellular telephones, cellular telephones coupled to position tracking devices, cellular telephones including position tracking devices, mobile electronic devices, mobile communication devices, personal digital assistants, and processor-based devices.

* * * * *

UNITED STATES PATENT AND TRADEMARK OFFICE
CERTIFICATE OF CORRECTION

| | | |
|---|---|---|
| PATENT NO. | : 8,321,636 B2 | |
| APPLICATION NO. | : 11/369898 | |
| DATED | : November 27, 2012 | |
| INVENTOR(S) | : Vantalon et al. | |

It is certified that error appears in the above-identified patent and that said Letters Patent is hereby corrected as shown below:

In Column 2, Line 47, delete "FIG." and insert -- FIGS. --, therefor.

In Column 3, Line 50, delete "example in" and insert -- example. In --, therefor.

In Column 6, Line 61, delete "24" and insert -- 214 --, therefor.

In Column 18, Line 41, delete "$0x_{0001}\_FFFF$." and insert -- 0x0001_FFFF. --, therefor.

In Column 17, Line 1, delete "0x600_0000" and insert -- 0x6001_0000 --, therefor.

Signed and Sealed this
Fifth Day of February, 2013

Teresa Stanek Rea
*Acting Director of the United States Patent and Trademark Office*